US011924621B2

(12) United States Patent
Gheldof

(10) Patent No.: US 11,924,621 B2
(45) Date of Patent: Mar. 5, 2024

(54) LOUDSPEAKER

(71) Applicant: PSS BELGIUM NV, Dendermonde (BE)

(72) Inventor: Karel Gheldof, Dendermonde (BE)

(73) Assignee: PSS BELGIUM NV, Dendermonde (BE)

( * ) Notice: Subject to any disclaimer, the term of this patent is extended or adjusted under 35 U.S.C. 154(b) by 97 days.

(21) Appl. No.: 17/612,624

(22) PCT Filed: May 26, 2020

(86) PCT No.: PCT/EP2020/064577
§ 371 (c)(1),
(2) Date: Nov. 19, 2021

(87) PCT Pub. No.: WO2020/239766
PCT Pub. Date: Dec. 3, 2020

(65) Prior Publication Data

US 2022/0248142 A1 Aug. 4, 2022

(30) Foreign Application Priority Data

May 29, 2019 (GB) ..................................... 1907610

(51) Int. Cl.
*H04R 1/02* (2006.01)
*H04R 7/12* (2006.01)
(Continued)

(52) U.S. Cl.
CPC ................ *H04R 9/06* (2013.01); *H04R 1/02* (2013.01); *H04R 7/12* (2013.01); *H04R 9/025* (2013.01);
(Continued)

(58) Field of Classification Search
CPC . H04R 1/00; H04R 1/02; H04R 1/026; H04R 1/028; H04R 9/00; H04R 9/02;
(Continued)

(56) References Cited

U.S. PATENT DOCUMENTS 5,081,684 A 1/1992 House
5,883,967 A 3/1999 House
(Continued)

FOREIGN PATENT DOCUMENTS

EP 0624049 A2 11/1994
EP 0942626 A2 9/1999
(Continued)

OTHER PUBLICATIONS

SA/EP, International Search Report and Written Opinion for corresponding PCT Patent Application No. PCT/EP2020/064577, dated Aug. 28, 2020, 12 pages.
(Continued)

*Primary Examiner* — Thang V Tran
(74) *Attorney, Agent, or Firm* — NK Patent Law

(57) ABSTRACT

A loudspeaker includes a diaphragm having a front surface facing in a forward direction for producing sound to be radiated outwardly from the loudspeaker in the forward direction and a back surface facing in a backward direction that is opposite to the forward direction; a magnet unit configured to provide magnetic field in a magnetic gap. The magnetic gap is located between a first portion of the magnet unit located radially inwards of the magnetic gap with respect to a longitudinal axis of the loudspeaker and a second portion of the magnet unit located radially outwards of the magnetic gap with respect to the longitudinal axis of the loudspeaker. A voice coil is configured to sit in the magnetic gap when the diaphragm is in a rest position.

15 Claims, 20 Drawing Sheets

(51) Int. Cl.
*H04R 9/02* (2006.01)
*H04R 9/04* (2006.01)
*H04R 9/06* (2006.01)
*H04R 29/00* (2006.01)

(52) U.S. Cl.
CPC ............. *H04R 9/045* (2013.01); *H04R 9/046* (2013.01); *H04R 29/001* (2013.01)

(58) Field of Classification Search
CPC . H04R 9/04; H04R 9/06; H04R 9/025; H04R 9/027; H04R 9/045; H04R 9/046; H04R 7/12; H04R 7/16; H04R 7/26; H04R 11/02; H04R 29/001
See application file for complete search history.

(56) References Cited

U.S. PATENT DOCUMENTS

| | | | | |
|---|---|---|---|---|
| 9,008,348 | B1 * | 4/2015 | Kallen | H04R 9/045 381/404 |
| 9,025,809 | B1 | 5/2015 | Kallen et al. | |
| 10,034,094 | B2 * | 7/2018 | Perkins | H04R 9/04 |
| 10,694,279 | B1 * | 6/2020 | Danovi | H04R 1/323 |
| 11,350,194 | B2 * | 5/2022 | Schepens | H04R 1/023 |
| 2001/0043712 | A1 * | 11/2001 | Kuze | H04R 9/04 381/396 |
| 2005/0207612 | A1 * | 9/2005 | D'Hoogh | H04R 7/122 381/423 |
| 2007/0036381 | A1 | 2/2007 | Klemenz et al. | |
| 2007/0036382 | A1 * | 2/2007 | Gladwin | H04R 7/26 381/337 |
| 2007/0147652 | A1 * | 6/2007 | Takayama | H04R 9/025 381/396 |
| 2012/0148086 | A1 * | 6/2012 | Tanabe | H04R 31/006 381/401 |
| 2015/0365769 | A1 | 12/2015 | Yoon et al. | |

FOREIGN PATENT DOCUMENTS

| | | | |
|---|---|---|---|
| EP | 1137320 | A2 | 9/2001 |
| EP | 0979592 | B1 | 8/2004 |
| JP | S5564500 | A | 5/1980 |
| JP | S579197 | A | 1/1982 |
| JP | 2002209296 | A | 7/2002 |
| WO | 2004017674 | A1 | 2/2004 |
| WO | 2019121072 | A1 | 6/2019 |

OTHER PUBLICATIONS

CNIPA, Office Action for Chinese Patent Application No. 202080039651.5, dated Nov. 21, 2023, 21 pages.

* cited by examiner

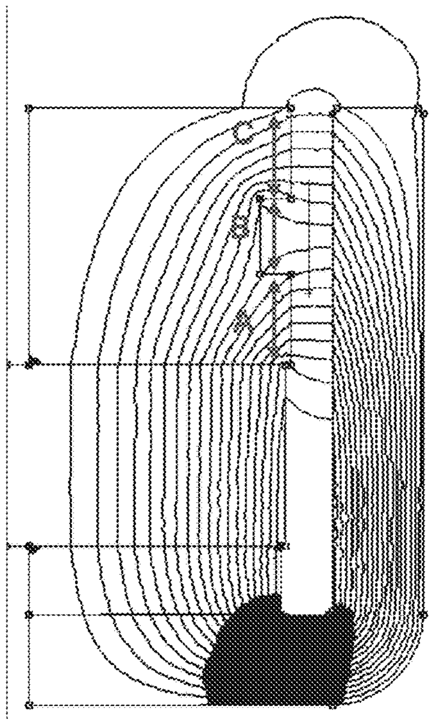
Fig. 6A(i)
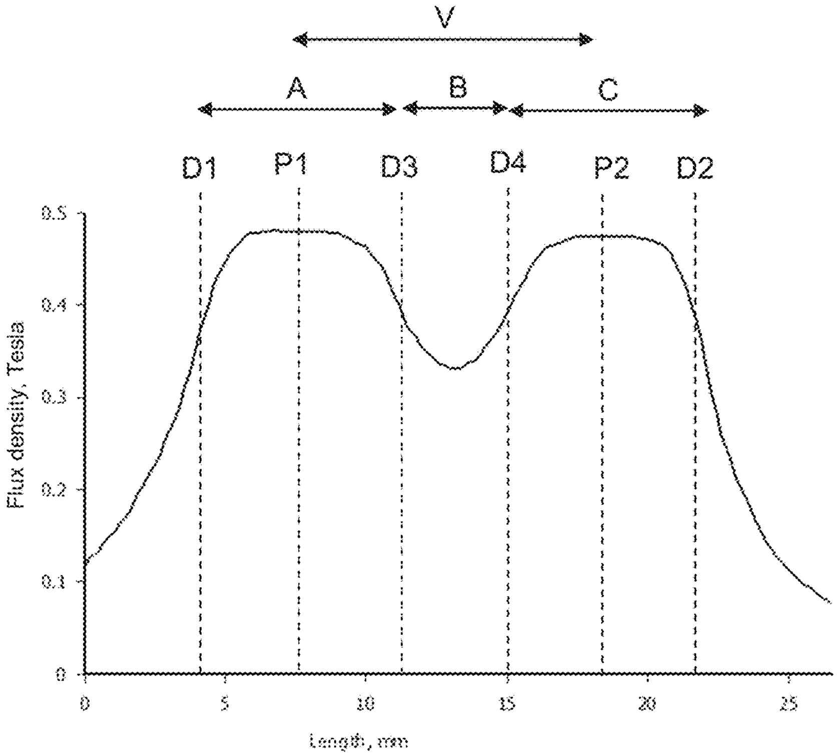
Fig. 6A(ii)

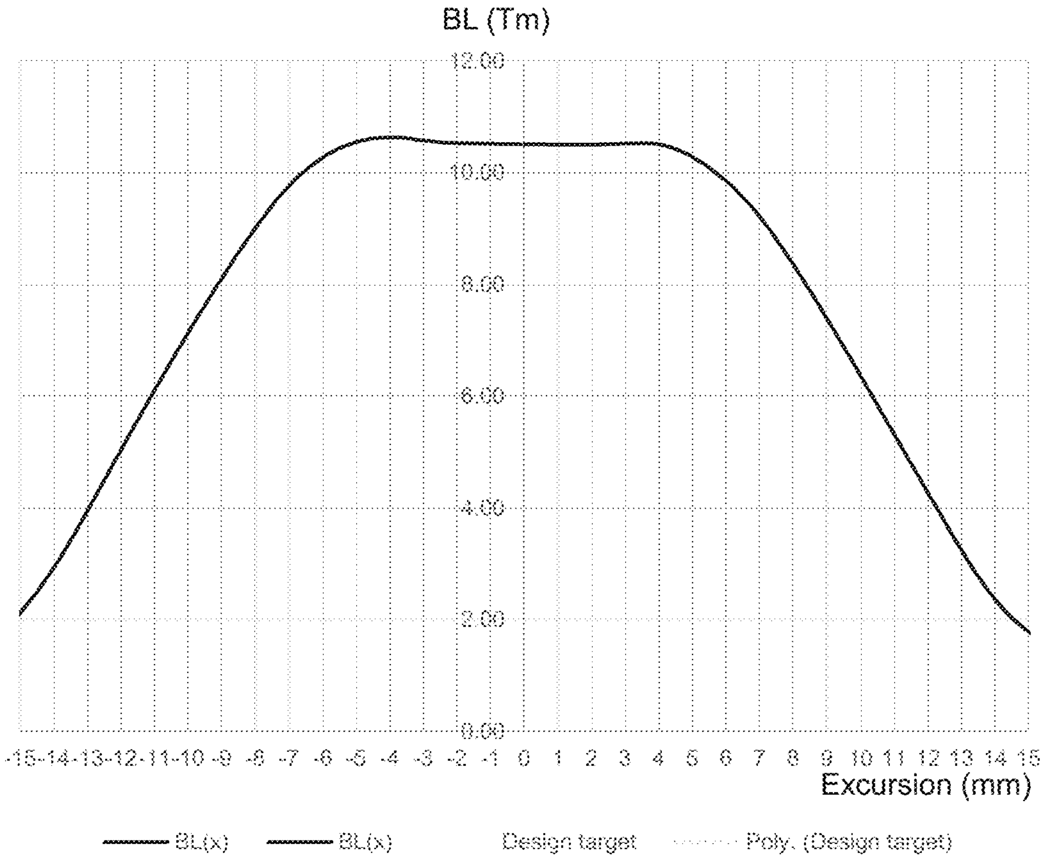
Fig. 6A(iii)

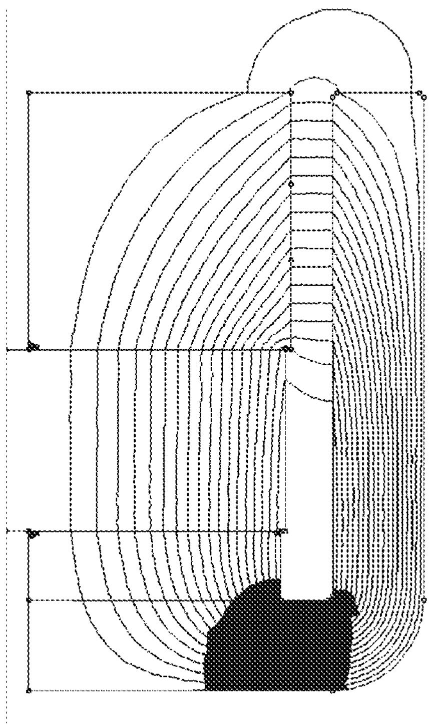
Fig. 6B(i)
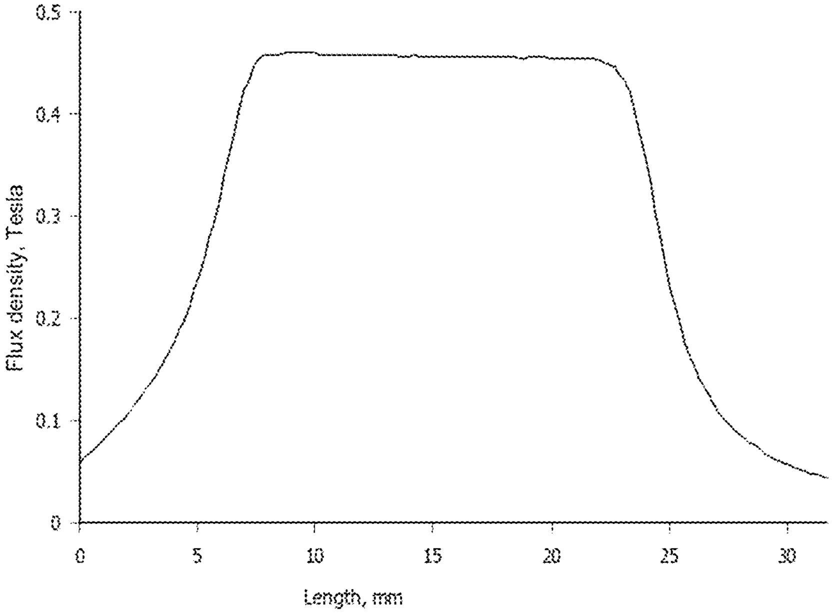
Fig. 6B(ii)

LOUDSPEAKER

CROSS REFERENCE TO RELATED APPLICATIONS

This application is a U.S. National Stage Application of International Patent Application No. PCT/EP2020/064577 entitled "LOUDSPEAKER" filed on May 26, 2020, which claims priority from United Kingdom Patent Application No. 1907610.8 entitled "LOUDSPEAKER" filed on May 29, 2019, the entire contents of all of which are herein incorporated by reference for all purposes.

FIELD OF THE INVENTION

The present invention relates to a loudspeaker.

BACKGROUND

Recently there has been an increased focus on the development and use of shallow loudspeakers in the loudspeaker industry. This can be seen in automotive applications, home audio applications, and public address applications. In most cases, the total speaker height is restricted due to application design choices, or due to practical limitations for positioning loudspeakers (e.g. loudspeakers under a seat in a vehicle, shallow subwoofer enclosures which fit underneath a couch).

It is a challenge to make loudspeakers which offer a shallow form factor yet are capable of comparable performance as a conventional form factor. This is particularly challenging for loudspeakers which can reproduce low frequencies (e.g. subwoofers), since achieving comparable performance generally requires the shallow form factor loudspeaker to move as much air as a conventional form factor loudspeaker. Assuming the diaphragms of the shallow form factor loudspeaker and the conventional form factor loudspeaker have the same outer diameter, to move as much air as a conventional form factor loudspeaker, the diaphragms of the shallow form factor loudspeaker must be capable of the same or similar excursion as the conventional form factor loudspeaker ("excursion" is defined in more detail below).

Loudspeakers can be categorised according to the relative heights of the voice coil and the magnetic gap (in the direction of a longitudinal axis of the loudspeaker) in their motors as follows:

- "Overhang"—in loudspeakers whose motors utilise an overhang arrangement, the height of the voice coil is longer than (usually significantly longer than) the height of the magnetic gap. This usually means there is typically some windings of the voice coil in the magnetic gap.
- "Equal hang"—in loudspeakers whose motors utilise an equal hang arrangement, the height of the voice coil is approximately (e.g. ±10%) the same as the height of the magnetic gap.
- "Under hang"—in loudspeakers whose motors utilise an under hang arrangement, the height of the voice coil is less than the height of the magnetic gap. This means the voice coil may be able to move out of the magnetic gap.

The motors in the majority of loudspeakers utilise an overhang arrangement ("overhang loudspeakers").

Loudspeakers which utilise an equal hang arrangement ("equal hang loudspeakers") are not often used, since force is lost quite rapidly when the voice coil is moved away from its rest position. However, equal hang loudspeakers can be high efficient because they may utilise lightweight coils. Equal hang loudspeakers are more often used in applications where the diaphragm does not need to move much (e.g. tweeters), but are rarer in subwoofers where a large excursion is required.

Loudspeakers which utilise an under hang arrangement ("under hang loudspeakers") are known, and are typically used when a low moving mass (mass of the moving parts of the loudspeaker) is required. A large excursion can be achieved with an under hang loudspeaker by having a large magnetic gap height. But a large magnetic gap height increases the height of a loudspeaker.

There are several alternative topologies which offer a height reduction in a loudspeaker compared with a conventional cone loudspeaker. In many of these topologies, the magnet unit is located within or partly within the concave surface of the cone. By way of example, one such topology is shown in FIG. 1 of WO2004/017674.

FIG. 1 of the present disclosure is a marked-up version of FIG. 1 of WO2004/017674 labelled with the following dimensions measured in a direction parallel to the longitudinal axis 10:

A. Yoke bottom thickness (thickness of feature 6*a*)
B. Max Mechanical excursion (distance between 6*b* and 6*a*)
C. Coil overhang (height windings 6*b*−gap/washer height)/2
D. Magnetic gap height (washer height)
E. Max Mechanical excursion (distance between washer and feature 8*b*1)
F. Mechanical coupling thickness (thickness of feature 22)
G. Max Mechanical excursion (as this also contributes to the total height of the loudspeaker—see below)

The total height of this loudspeaker topology is defined by the stack up height (A+B+C+D+E+F+G).

Herein:

- "Excursion" may be defined as the distance, as measured along the longitudinal axis of the loudspeaker, in which a rigid movable part of the loudspeaker (such as the diaphragm) moves from its rest position (in either a forwards or backward direction along the longitudinal axis) when the loudspeaker is used under a given set of conditions.
- "Maximum linear excursion" (or "max linear excursion") may be defined as the excursion at which the force generated by the voice coil (when energised) drops to 82% of the force generated by the voice coil (when energised with the same current) at its rest position. This definition is common in the industry. This parameter is independent of the applied current.
- "Maximum real application excursion" (or "max real application excursion") may be defined as the maximum excursion achievable by a rigid movable part of the loudspeaker (e.g. the diaphragm) when the loudspeaker is used in a given application (e.g. when used in accordance with parameters defined by a manufacturer)
- "Maximum mechanical excursion" (or "max mechanical excursion") may be defined as the maximum excursion achievable by a rigid movable part of the loudspeaker (e.g. the diaphragm) before any one or more rigid moveable parts of the loudspeaker would, when the loudspeaker is in use, be caused to hit a static part of the loudspeaker (e.g. a frame or grille of the loudspeaker).

A skilled person will appreciate that in general:

$$\text{max linear excursion} < \text{max real application excursion} < \text{max mechanical excursion}$$

In particular, in the topology shown in FIG. 1 there is a relation between the max linear excursion (related to coil overhang) and the max mechanical excursion. Specifically, the max mechanical excursion will typically be a factor larger than the max real application excursion. This factor can be seen as a safety factor to prevent "bottoming" of the loudspeaker, where movable parts hit static parts of the loudspeaker.

However, if more height reduction is needed whilst keeping the same max linear excursion and max mechanical excursion, other measures generally have to be taken to realize this height reduction.

In relation to any rigid moveable element of a loudspeaker (e.g. a diaphragm) of a loudspeaker, there may be defined a "rest position", a "maximum forward position" (or "max forward position") and a "maximum backward position" (or "max backward position).

The term "rest position" of a rigid movable element of the loudspeaker (e.g. the diaphragm) may be defined as the position of that rigid element when the rigid element is at rest with respect to static elements of the loudspeaker and a voice coil of the loudspeaker is not energised.

The maximum forward position of a rigid element of a loudspeaker (e.g. a diaphragm) may be defined as a position in which that rigid element is located forwards of its rest position at a distance from its rest position that is equal to the max mechanical excursion as measured along the longitudinal axis of the loudspeaker.

The maximum backward position of a rigid element of a loudspeaker (e.g. a diaphragm) may be defined as a position in which that rigid element is located backwards of its rest position at a distance from its rest position that is equal to the max mechanical excursion as measured along the longitudinal axis of the loudspeaker.

Throughout this disclosure, when we talk about the "total height" or "stack up height" of a loudspeaker, we refer to the height of the loudspeaker when the diaphragm of the loudspeaker is positioned at its maximum forward position. This corresponds to the forward-most position at which the diaphragm can reach in practice (since any further movement of a rigid part of the loudspeaker would, when the loudspeaker is in use, cause the rigid part of the loudspeaker to hit a static part of the loudspeaker). This is a reasonable way to define total height, since any enclosure for the loudspeaker would need to allow for such movement of its rigid moveable parts).

Some attempts have been made in the prior art to reduce the total height of loudspeakers by coupling the membrane by means of a rigid connector which extends through radial openings (slots) in the magnet unit, although these topologies tend to result in minimal height reduction as compared to the topology shown in FIG. 1 or cause other problems which make these concepts not interesting or impractical.

Examples of loudspeakers in which such a rigid connector is used include U.S. Pat. No. 9,025,809, EP0979592B1, EP1137320A2 and U.S. Pat. No. 5,883,967.

FIG. 2 of the present disclosure is a marked-up version of FIG. 5 of U.S. Pat. No. 9,025,809, showing a loudspeaker topology labelled with the following dimensions measured in a direction parallel to the longitudinal axis A:

A. Yoke bottom thickness (thickness of feature 71')
B. Max Mechanical excursion (distance between feature 71' and feature 58'/30)
C. Coil overhang (height windings 30—magnetic gap height/washer height 78)/2
D. Magnetic gap height (washer height 78)
E. (thickness of opposition magnet (76)) (optional part)

F. Max Mechanical excursion (distance between feature 78—and feature 28)
G. Additional height (marked with '7' on the drawing)
H. Max Mechanical excursion The total height of this loudspeaker topology is defined by the stack up height (A+B+C+D+F+G+H+(optionally) E).

FIG. 3 of the present disclosure is a marked-up version of FIG. 1 of EP0979592B1, showing a loudspeaker topology labelled with the following dimensions measured in a direction parallel to the longitudinal axis (parallel to direction 14):

A. Yoke bottom thickness (thickness of feature 32)
B. Max Mechanical excursion (distance between feature 18 and feature 32)
C. Coil height for under hang
D. Coil under hang (distance from top of feature 18 and top of feature 34)
E. Max Mechanical excursion
F. Edge unrolling The total height of this loudspeaker topology is defined by the stack up height (A+B+C+D+E+F).

FIG. 4 of the present disclosure is a marked-up version of FIG. 15 of EP1137320A2, showing a loudspeaker topology labelled with the following dimensions measured in a direction parallel to the longitudinal axis:

A. Yoke bottom thickness (thickness of feature 23)
B. Max Mechanical excursion (distance from top of feature 23 to bottom of feature 9*a*)
C. Coil overhang (height windings−magnetic gap height/washer height 2)/2
D. Magnetic gap height (washer height, 2)
E. Max Mechanical excursion (distance from top of feature 3 to bottom of feature 18)
F. Mechanical coupling distance (thickness of feature 18)
G. Max Mechanical excursion The total height of this loudspeaker topology is defined by the stack up height (A+B+C+D+E+F+G).

With reference to FIG. 2, U.S. Pat. No. 9,025,809 describes a shallow loudspeaker using a slotted sidewall yoke. The spider has a flexible portion, has rigid members extending through the yolk slots, and has a channel affixed to the former bottom edge such that the channel is no wider than the former and winding(s). The damper couples to the bottom of the coil former, while the membrane couples above the winding wires. However, despite using a mechanic coupler which couples the voice coil through radial openings of the magnet unit, there is hardly any reduction in total height of the speaker as the total height of the loudspeaker is still A+B+C+D+E+F+G+H.

With reference to FIG. 3, EP0979592B1 describes a loudspeaker with a large coil inwardly coupled to a diaphragm by means of ribs. By using this structure, one can make a transducer which offers height reduction as compared to other inverted type of transducers like the one shown in FIG. 1 of the present disclosure. A problem with this loudspeaker is that the excursion in the forwards direction results in a large edge (30) radius leading to significant height increase. A second problem of this loudspeaker is that this solution is not economic for larger transducers (e.g. having a diaphragm diameter of 60 mm or larger, 90 mm or larger, or even 140 mm or larger) as the motor and the voice coil are magnitudes more expensive as compared to transducers where the motor is at the inner perimeter. A third problem of this described loudspeaker is that the solution becomes less efficient for larger transducers, as the clearance of the voice coil to the motor stator needs to be increased.

Furthermore, the moving mass of the voice coil increases significantly leading towards another loss of efficiency.

The variant described with reference to FIG. 6 of EP0979592B1, which has an inside extending and an outside extending diaphragm does not offer a height reduction as compared to other inverted type of transducers like FIG. 1 of the present disclosure. This is because element 430 of FIG. 6 of EP0979592B1 adds full mechanic excursion to the stack up height, leaving the total height of the loudspeaker as A+B+C+D+E+F.

With reference to FIG. 4 of the present disclosure, EP1137320A2 describes a loudspeaker with a plurality of slits which offers a shallow form factor in which a thin plate (18) covers the slits and the upper face of the yoke, thus making it airtight between the front and rear of the membrane. Though, when analyzing the stack up height of this loudspeaker, there is no height reduction as compared to the loudspeaker shown in FIG. 1 of the present disclosure, since the total height of the loudspeaker in this case is A+B+C+D+E+F+G.

The example from EP1137320A2 shown in FIG. 4 of the present disclosure (which corresponds to FIG. 15 of EP1137320A2) is presented by EP1137320A2 as "example 4". The previously described examples 1-3 in EP1137320A2 don't offer any measures to make a sealing that provides airtightness between the front of the membrane and the rear of the membrane. When mounting such a speaker in a closed volume application, it will suffer from loss in efficiency due to air pressure leakage through the slits of the magnet unit. Furthermore, this air flow through the slits of the magnet unit may cause turbulence (or blowing noise) which may be perceived by listeners as a poor-quality transducer.

The present invention has been devised in light of the above considerations.

SUMMARY OF THE INVENTION

According to a first aspect, the present invention provides:

A loudspeaker including:

- a diaphragm having a front surface facing in a forward direction for producing sound to be radiated outwardly from the loudspeaker in the forward direction and a back surface facing in a backward direction that is opposite to the forward direction;
- a magnet unit configured to provide magnetic field in a magnetic gap, wherein the magnetic gap is located between a first portion of the magnet unit located radially inwards of the magnetic gap with respect to a longitudinal axis of the loudspeaker and a second portion of the magnet unit located radially outwards of the magnetic gap with respect to the longitudinal axis of the loudspeaker;
- a voice coil, configured to sit in the magnetic gap when the diaphragm is in a rest position, and is further configured to produce a magnetic field in use which interacts with the magnetic field provided by the magnet unit in the magnetic gap so as to move the diaphragm along the longitudinal axis of the loudspeaker;
- wherein the height of the voice coil in the direction of the longitudinal axis of the loudspeaker is less than the height of the magnetic gap in the direction of the longitudinal axis of the loudspeaker;
- wherein the voice coil is rigidly connected to the diaphragm via a rigid connector, wherein the rigid connector includes ribs which extend radially outwardly from the voice coil through slits in the second portion of the magnetic unit;
- wherein the first portion of the magnet unit and the second portion of the magnet unit are configured such that magnetic flux density of the magnetic field in the magnetic gap reaches a first local maximum at a first peak location along the longitudinal axis of the loudspeaker and a second local maximum at a second peak location along the longitudinal axis of the loudspeaker, wherein the first peak location and the second peak location are separated spatially in the direction of the longitudinal axis of the loudspeaker by a valley region in which the magnetic flux density is lower than both the first local maximum and the second local maximum, wherein the voice coil is configured to be positioned in the valley region when the diaphragm is in its rest position.

In this way, a loudspeaker according to the present invention can be viewed as utilising an under hang voice coil arrangement in combination with a slotted magnet unit and a dual peak magnetic flux magnet unit.

The present inventor observes that by using these three features in combination, it is possible to achieve a loudspeaker having a particularly small total height, yet a large max real application excursion. This is because, firstly, the under hang voice coil arrangement in combination with the slotted magnet unit allows the loudspeaker to have a small total height. Yet the dual peak magnetic flux magnet unit allows for a large real application excursion whilst using a magnet unit with a small height. This arrangement is particularly useful in a subwoofer, where large real application excursions are required, and design requirements are quite different from other types of loudspeakers. Moreover, the present loudspeaker is particularly beneficial when used with the flexible dustcap described in PCT application PCT/EP2018/084048, extracts from which are incorporated in the description and drawings of this application (see below).

Whilst loudspeakers employing different ones of these three features (under hang voice coil arrangement, slotted magnet unit, dual peak magnetic flux magnet unit) are known to the present inventor, the present inventor is not aware of these three features being used in combination.

Loudspeakers using a slotted magnet unit without a solid dust cap generally have the downside that there is a centre part in the radiating surface which is not contributing to the air displacement. In such systems, it is therefore highly recommended to keep the diameter of the voice coil (and subsequently the magnet unit diameter) as small as strictly needed. On the other hand, magnet units with small voice coils have a limited maximum generated force factor, where force factor (in standard units of T.m) is given by force factor=B×L, wherein B is the magnetic field strength within the magnetic gap and L is the length of the wire of the voice coil that is active within the magnetic field (Force can be obtained by force factor x where i is the current through the wire; force factor is sometimes expressed as "BL value" herein). This is due the limited magnetic energy of the magnet gap volume. It is therefore important for loudspeakers with slotted magnet units to get the maximum BL value out of an as small as possible diameter. When the inventor has compared a loudspeaker traditional under hang arrangement according to the present invention (whose magnet unit has 2 distinct peaks in the magnetic flux profile), it has been found that for the same magnet diameter and height, the same coil diameter, the same coil winding specifications, the same linear excursion, the BL value can be raised by about 5%. Additionally, when high linearity is required with a shallow total magnet unit height, this difference can become even bigger (e.g. 25% is not an exception) and can lead to cases where it is impractical to use a traditional under hang loudspeaker.

In this disclosure, a voice coil can be understood as a coiled length of wire that is rigidly connected to the diaphragm. The voice coil is preferably considered to be distinct from any of the (typically non-coiled) electrical connections used to supply electrical energy to the voice coil.

In this disclosure, the height of a voice coil may be defined as the height of the voice coil in the direction of the longitudinal axis of the loudspeaker.

By way of convention, in this disclosure the first peak location may be positioned backwards of the valley region (i.e. on a side of the valley region that is further along the longitudinal axis in the backward direction than the valley region), and the second peak location may be positioned forwards of the valley region (i.e. on a side of the valley region that is further along the longitudinal axis in the forward direction than the valley region).

The magnetic gap may extend from the first peak location in a direction along the longitudinal axis that leads away from the valley region to a first drop off location at which magnetic flux first drops off to 80% of the magnetic flux density at the first peak location.

The magnetic gap may extend from the second peak location in a direction along the longitudinal axis that leads away from the valley region to a second drop off location at which magnetic flux first drops off to 80% of the magnetic flux density at the second peak location.

The magnetic gap may extend from the first peak location in a direction along the longitudinal axis that leads into the valley region to a third drop off location at which magnetic flux first drops off to 80% of the magnetic flux density at the first peak location.

The magnetic gap may extend from the second peak location in a direction along the longitudinal axis that leads into the valley region to a fourth drop off location at which magnetic flux first drops off to 80% of the magnetic flux density at the second peak location.

In this disclosure, the height of the magnetic gap may be defined as the distance between the first drop off location and the second drop off location as measured in the direction of the longitudinal axis of the loudspeaker.

The height of the magnetic gap usually corresponds roughly to height of a washer that is included in the magnet unit and is configured to guide magnetic flux across the magnetic gap, but this need not be the case for all loudspeakers.

The locations (first drop off location, first peak location, second peak location, second drop off location) as described above could readily be worked out for a given loudspeaker by a skilled person, e.g. using calculations, measurement or a combination of the two.

The first portion of the magnet unit and the second portion of the magnet unit may be configured such that magnetic flux density of the magnetic field in the valley region reaches a local minimum at a valley bottom location along the longitudinal axis of the loudspeaker. The magnetic flux density at the valley bottom location is preferably 90% or less, more preferably 80% or less of the magnetic flux density at one/both of the first peak location and the second peak location.

A magnet unit capable of producing magnetic flux having a profile as described above could readily be produced by a skilled person. For example, the first and/or second portion of the magnet unit could be a washer that includes at least one recess (e.g. a cut out) at a location along the longitudinal axis corresponding to the valley region. The cut out may accommodate a shorting ring (which could be an electrically conducting ring configured to dissipate eddy currents). Other methods may also be employed (e.g. a cut out in one or more magnets configured to guide magnetic flux across the magnetic gap).

A shorting ring can be understood as an electrically conducting ring which may be located near (e.g. within 5 mm of) the windings of the voice coil. This may be used to reduce and/or to linearise self-inductance of the voice coil (Le). Note that the self-inductance of the voice coil (Le) will vary with position of the voice coil inside of the magnet unit, and would usually be seen of as a function of (voice coil) excursion.

The height of the voice coil of the loudspeaker (measured in the direction of the longitudinal axis) may be 15 mm or less, more preferably 11 mm or less, more preferably 7 mm or less. The height of the voice coil may be similar to the maximum linear excursion, e.g. up to 1.5× the maximum linear excursion.

The height of the magnetic gap (measured in the direction of the longitudinal axis) of the loudspeaker may be 20 mm or less, more preferably 15 mm or less, more preferably 10 mm or less.

The height of the magnet unit of the loudspeaker (measured in the direction of the longitudinal axis) may be 15 mm or less, more preferably 10 mm or less, more preferably 5 mm or less.

In connection with the height of the magnet unit of the loudspeaker, the magnet unit can be understood as comprising those one or more elements that provide the magnetic field in the magnetic gap. Typically such elements include a U yoke, a permanent magnet and at least one washer. Other magnet configurations are available.

The max linear excursion of the loudspeaker may be 5 mm or more, more preferably 8 mm or more, more preferably 11 mm or more.

The maximum mechanical excursion of the loudspeaker may be 12 mm or more, more preferably 17 mm or more, more preferably 25 mm or more.

The maximum real application excursion of the loudspeaker may be 10 mm or more, more preferably 15 mm or more, more preferably 20 mm or more.

Preferably, the voice coil includes two or more winding layers. The number of winding layers can be understood as the maximum number of layers of wire in the voice coil.

An even number of (e.g. 2, 4 or 6) winding layers is preferred as this means electrical connections can be provided at the same end of the voice coil.

The wire from which the voice coil is formed preferably has a square or rectangular cross section, since this helps to achieve better stacking density. Other cross sections are possible, e.g. round cross sections (which tend to be the most economical).

Above, it was explained that loudspeakers with a slotted magnet unit and without a solid dust cap are optimally designed with an as small as possible voice coil diameter. It was also shown that with fixed voice coil parameters, magnet volume, magnet unit height, the split gap option gives more BL. In order to get an as high as possible BLi out of a certain voice coil diameter having a certain winding height in a defined motor system, it is beneficial to increase the number of winding layers. As the force (BL) is given by $F = B \times L \times i$, one will reach a higher force if the L increases by adding more layers of windings.

However, increasing the number of layers also leads to a higher self-inductance (Le). A high Le leads to a drop in sound pressure level at elevated frequencies. Secondly, a high Le combined with Le(x) nonlinearity can as well lead to non-symmetric excursion above the resonance frequency (called "DC offset"). This non-symmetric excursion will cause distortion. Therefore in classic loudspeaker topologies, one would be careful with increasing the number of winding layers in an under hang design, and would likely choose a larger voice coil diameter with less winding layers in order to reach a certain BL. However, when multiple winding layers are utilised with the dual peak magnetic flux magnet unit described herein, particularly where a cut out is used to achieve the dual peak magnetic flux magnet unit (see above), the cut out of the dual peak magnetic flux magnet unit offers a space to mount a shorting ring which is of particular use in the context of the present invention. In particular, if a shorting ring needs to be introduced in a classic under hang magnet unit design, one needs to include a copper shielding ring at the outer diameter of the washer. As the clearance to the coil must remain equal, it means that the washer outer diameter will decrease, which will lead to another BL drop of typically 2-5%. This can be avoided where a cut out is used as described herein.

The loudspeaker may include a flexible dustcap and/or any feature of a loudspeaker as described in unpublished PCT application PCT/EP2018/084048, extracts from which are incorporated in the description and drawings of this application (see below).

Thus, the loudspeaker may include a flexible dustcap attached to the diaphragm and an attachment surface of the loudspeaker that is fixed with respect to the magnet unit and is located radially inwards of the voice coil relative to the longitudinal axis of the loudspeaker.

The loudspeaker according to the present invention may include any feature (associated with the dustcap or otherwise) as described in the text and drawings of PCT/EP2018/084048.

For example, the flexible dustcap may include more than one corrugation.

For the purposes of this disclosure, the term "corrugation" being used with respect to an element can be understood as a ridge or a furrow formed in the element. Each corrugation (e.g. ridge or furrow) included in the flexible dustcap may extend around the longitudinal axis of the loudspeaker, e.g. in a circumferential direction with respect to the longitudinal axis of the loudspeaker.

For example, the flexible dustcap may be configured to allow the diaphragm to be moved along the longitudinal axis from a rest position up to a max forward position (referred to as "maximum extent in the forward direction" in PCT/EP2018/084048) and a max backward position (referred to as "maximum extent in the backward direction" in PCT/EP2018/084048) without the flexible dustcap contacting the magnet unit or the voice coil in use.

For example, the attachment surface of the loudspeaker that is fixed with respect to the magnet unit may be a surface of the magnet unit, or a surface on a frame of the loudspeaker that is fixed with respect to the magnet unit. In some examples, the attachment surface may be a front surface of the magnet unit, which faces in the forward direction. The attachment surface may include a recessed portion (e.g. a cut-out in a front surface of a washer) to facilitate attachment of the flexible dustcap to the attachment surface.

The flexible dustcap may (e.g. when the diaphragm is in its rest position) include an upstanding portion which extends around the longitudinal axis of the loudspeaker (e.g. in a circumferential direction with respect to the longitudinal axis) and which, when viewed in a cross-section taken along the longitudinal axis of the loudspeaker, extends in the forwards direction from the attachment surface of the loudspeaker, preferably at an angle that is no more than 30°, more preferably an angle that is no more than 20°, with respect to the longitudinal axis of the loudspeaker. The upstanding portion may attach to the attachment surface of the loudspeaker, directly or indirectly, e.g. via an (optional) inner attachment portion of the flexible dustcap.

The flexible dustcap may (e.g. when the diaphragm is in its rest position) include an outwardly extending portion which extends around the longitudinal axis of the loudspeaker (e.g. in a circumferential direction with respect to the longitudinal axis) and which, when viewed in a cross-section taken along the longitudinal axis of the loudspeaker, extends radially outwards from the upstanding portion relative to the longitudinal axis of the loudspeaker. The outwardly extending portion may, when viewed in a cross-section taken along the longitudinal axis of the loudspeaker, form an angle that is no more than 20° with respect to a radial axis that extends radially outwardly from and is perpendicular to the longitudinal axis of the loudspeaker.

The upstanding portion may (e.g. when the diaphragm is in its rest position) be joined to the outwardly extending portion by a bend in the flexible dustcap, wherein the bend extends around the longitudinal axis of the loudspeaker (e.g. in a circumferential direction with respect to the longitudinal axis). The first bend, when viewed in a cross-section taken along the longitudinal axis of the loudspeaker, preferably has a smoothly changing curvature, rather than being a sharp fold or corner in the flexible dustcap.

The flexible dustcap may (e.g. when the diaphragm is in its rest position) include a first corrugation which extends around the longitudinal axis of the loudspeaker (e.g. in a circumferential direction with respect to the longitudinal axis). The first corrugation, when viewed in a cross-section taken along the longitudinal axis of the loudspeaker, may form a ridge or furrow in the flexible dustcap (depending on how it is oriented). The first corrugation may, when viewed in a cross-section taken along the longitudinal axis of the loudspeaker, include two arms which join at a base, e.g. to form a "U" shape or a "V" shape (preferably a "U" shape). Preferably the first corrugation is oriented with its base facing in the backward direction. One arm (preferably the radially innermost arm) of the first corrugation may be joined to the outwardly extending portion, preferably via a non-smoothly changing fold (e.g. a sharp fold or corner) in the flexible dustcap.

The flexible dustcap may (e.g. when the diaphragm is in its rest position) include a second corrugation which extends around the longitudinal axis of the loudspeaker (e.g. in a circumferential direction with respect to the longitudinal axis). The second corrugation, when viewed in a cross-section taken along the longitudinal axis of the loudspeaker, may form a ridge or furrow in the flexible dustcap (depending on how it is oriented). The second corrugation may, when viewed in a cross-section taken along the longitudinal axis of the loudspeaker, include two arms which join at a base, e.g. to form a "U" shape or a "V" shape (preferably a "U" shape). Preferably the second corrugation is oriented with its base facing in the forward direction. One arm (preferably the radially innermost arm) of the second corrugation may also be an arm (preferably the radially outermost arm) of the first corrugation. One arm (preferably the radially outermost arm) of the second corrugation may attach to the diaphragm, e.g. a front or back surface of the diaphragm, e.g. directly, or via an (optional) outer attachment portion of the flexible dustcap.

The flexible dustcap may (e.g. when the diaphragm is in its rest position) extend in the direction of the longitudinal axis by a distance (G) above a forward-most location on the voice coil when the diaphragm is at its max forward position. G is preferably 20 mm or less, more preferably 10 mm or less, more preferably 8 mm or less, more preferably 5 mm or less, more preferably 4 mm or less, more preferably 3 mm or less, more preferably 2 mm or less, more preferably 1 mm or less.

The flexible dustcap may be a single piece of flexible material, e.g. rubber or textile (with or without coating), or may be made of multiple materials attached to each other (a single piece of flexible material is preferred).

The first portion of the magnet unit is preferably a washer configured to guide magnetic flux across the magnetic gap, though could be/include a magnet.

The second portion of the magnet unit is preferably a washer configured to guide magnetic flux across the magnetic gap, though could be/include a magnet. Preferably a magnet is not used as the second portion of the magnet unit as it is difficult/expensive to put slits in a magnet (which may result in the second portion of the magnet unit including multiple magnets).

Preferably, the loudspeaker includes a single magnet, e.g. which is configured to provide magnetic flux to the first and second portions of the magnet unit. The magnet may be separate from the first and second portions of the magnet unit.

The loudspeaker may be a subwoofer, e.g. configured to produce sound with frequencies in a bass frequency range, e.g. with frequencies that do not exceed 400 Hz, more preferably with frequencies that do not exceed 300 Hz, more preferably with frequencies that do not exceed 200 Hz.

The diaphragm may have a width (e.g. diameter, if the diaphragm is circular) of 60 mm or more, 90 mm or more, or even 140 mm or more.

The voice coil may be configured to produce a magnetic field when an electric current is passed through it in use, wherein the magnetic field produced by the voice coil interacts with the magnetic field provided by the magnet unit in the magnetic gap so as to move the diaphragm forwards and backwards along a longitudinal axis of the loudspeaker. The electric current passed through the voice coil may be configured to move the voice coil in a predetermined frequency range, e.g. a bass frequency range.

The loudspeaker may include a frame. The magnet unit may be attached to the frame (directly or indirectly) such that the magnet unit is fixed with respect to the frame. The diaphragm may be suspended from the frame via one or more suspension elements. The one or more suspension elements may include a roll suspension (e.g. a half-roll edge suspension) which extends (preferably continuously) around an outer edge of the diaphragm. The one or more suspension elements may include a textile suspension (e.g. spider) which connects to the diaphragm (directly, or via another element such as the rigid connector) at a region of the diaphragm that is radially inwards of the outer edge of the diaphragm with respect to the longitudinal axis of the loudspeaker. A spider is typically a ring of textile material.

The loudspeaker may include a voice coil former.

The voice coil former may be attached to or integrally formed with the rigid connector, for example.

The longitudinal axis may extend through a central region of the loudspeaker, preferably through a centre of the voice coil and/or with the voice coil extending around the longitudinal axis. If the diaphragm is rotationally symmetric, the longitudinal axis may pass through the rotational axis of symmetry of the diaphragm.

A radial axis of the loud speaker may be defined as extending radially outwardly from and being perpendicular to the longitudinal axis of the loudspeaker.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which:

FIG. 6A(i) shows magnetic flux within the magnet unit of the loudspeaker of FIG. 5A.

FIG. 6A(ii) shows how magnetic flux density within the magnetic gap of the magnet unit of FIG. 6A(i) varies with position along the longitudinal axis of the loudspeaker.

FIG. 6A(iii) shows the BL(x) curve for the magnet unit of FIG. 6A(i).

FIG. 6B(i) shows magnetic flux within a magnet unit similar to that of the loudspeaker of FIG. 5A, but without a cut out in the first portion of the magnet unit.

FIG. 6B(ii) shows how magnetic flux density within the magnetic gap of the magnet unit of FIG. 6B(i) varies with position along the longitudinal axis of the loudspeaker.

DETAILED DESCRIPTION OF THE INVENTION

Figure 1:
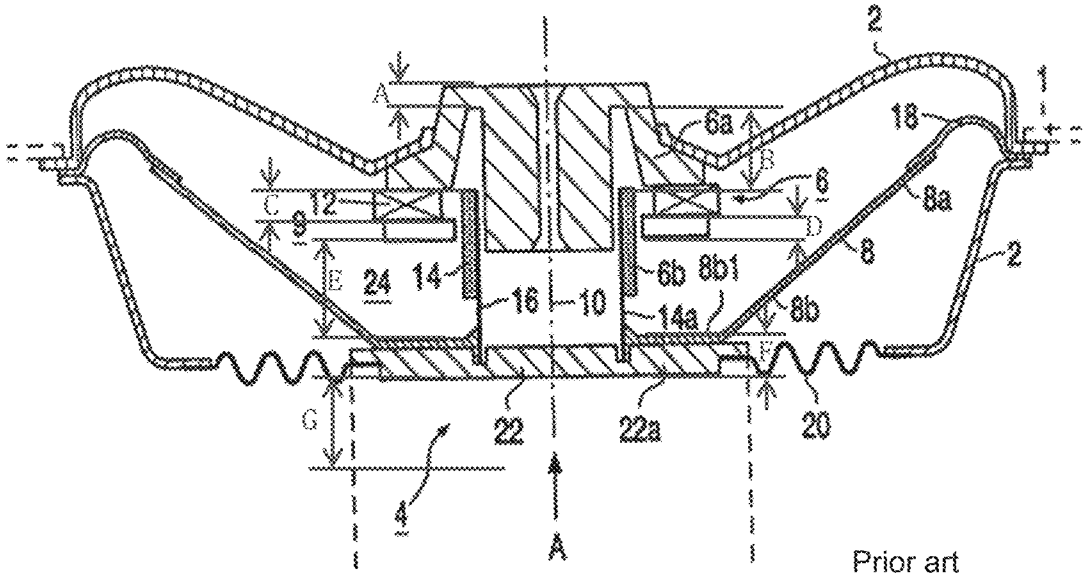
FIG. 1 is a marked-up version of FIG. 1 of WO2004/017674.

Aspects and embodiments of the present invention will now be discussed with reference to the accompanying figures. Further aspects and embodiments will be apparent to those skilled in the art. All documents mentioned in this text are incorporated herein by reference.

The example loudspeakers set out below make use of multiple features in order to reach an economical, efficient and very shallow loudspeaker.

These features may include some or all of the following:

1. Use of a rigid connector which connects the voice coil to the diaphragm with ribs that extend through slots in an outer wall of the magnet unit ("a slotted magnet unit");
2. An under hang voice coil arrangement in which the height of the voice coil ("winding height") is less than the height of the magnetic gap (corresponding to a washer height);
3. A magnet unit that has 2 distinct peaks in its magnetic flux profile ("a dual peak magnetic flux magnet unit")
4. A voice coil that sits between both distinct peaks in the magnetic flux profile when the diaphragm is in its rest position
5. A magnet unit that has a single magnet providing the total magnetic flux.
6. A flexible dustcap, which is designed in such a way that the small winding height voice coil is hardly adding total height to the loudspeaker when the diaphragm is in its max forward position.

The examples set out below may provide a shallow loudspeaker, which may be configured as a subwoofer, which offers a shallower form factor as compared to the known concepts discussed in the background section or other type of loudspeakers which couple the diaphragm to the voice coil at a connection point located higher than the highest point of the magnet system when the diaphragm is at rest.

In the examples described below, the loudspeaker is able to have an airtight sealing, whilst hardly increasing the total height of the loudspeaker. In part this is achieved by using the flexible dustcap described in PCT application PCT/EP2018/084048, extracts from which are incorporated in the description and drawings of this application (see below). This dustcap design offers a significant height reduction as compared to traditional dustcap designs.

When a dustcap is required, the flexible dustcap described herein is particularly useful with the presently described examples which utilise a small winding height voice coil, since some of the height reducing benefits of these examples would be lost if other more traditional forms of dustcap were used.

The described examples may be capable of a large linear excursion, e.g. 5 mm or larger.

By using a dual peak magnetic flux magnet unit design with 2 distinct peaks in the magnetic flux profile, combined with a short winding height voice coil, a large linear excursion can be achieved with a small voice coil height. In other words, the 2 peaks in the magnetic flux profile help to extend the region in which a significant drop off in force occurs.

Detailed Example

An example loudspeaker 100 according to the invention is shown in FIGS. 5A-5K, and described with reference to FIGS. 6A-6B.

Figure 5A:
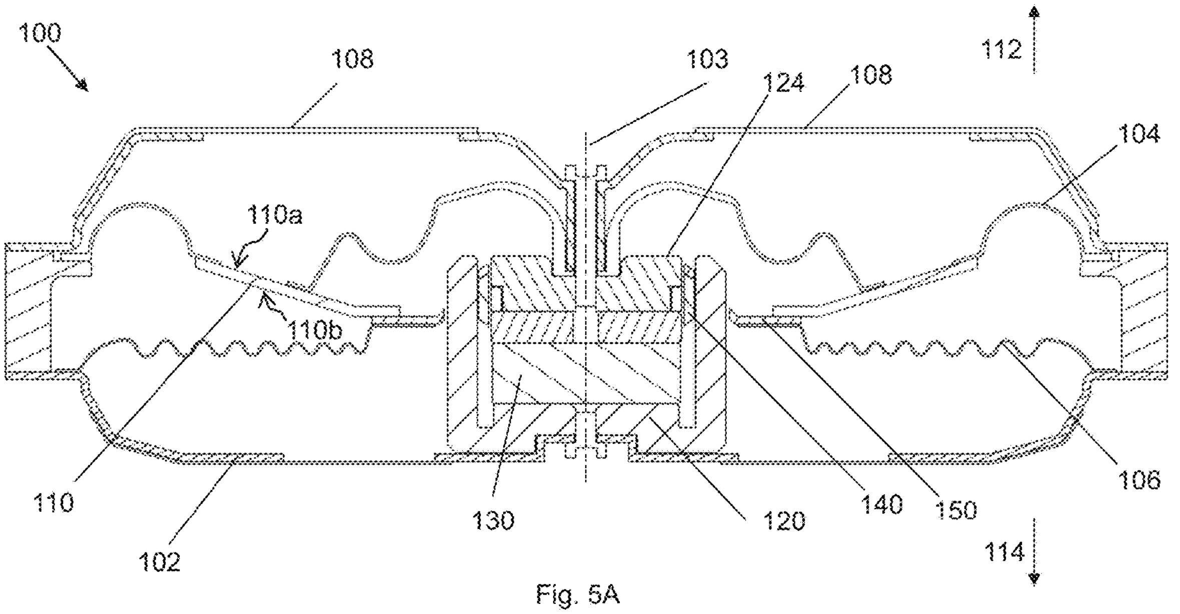
FIG. 5A is loudspeaker according to the invention, shown in cross section, with the diaphragm in its rest position.
Figure 5B:
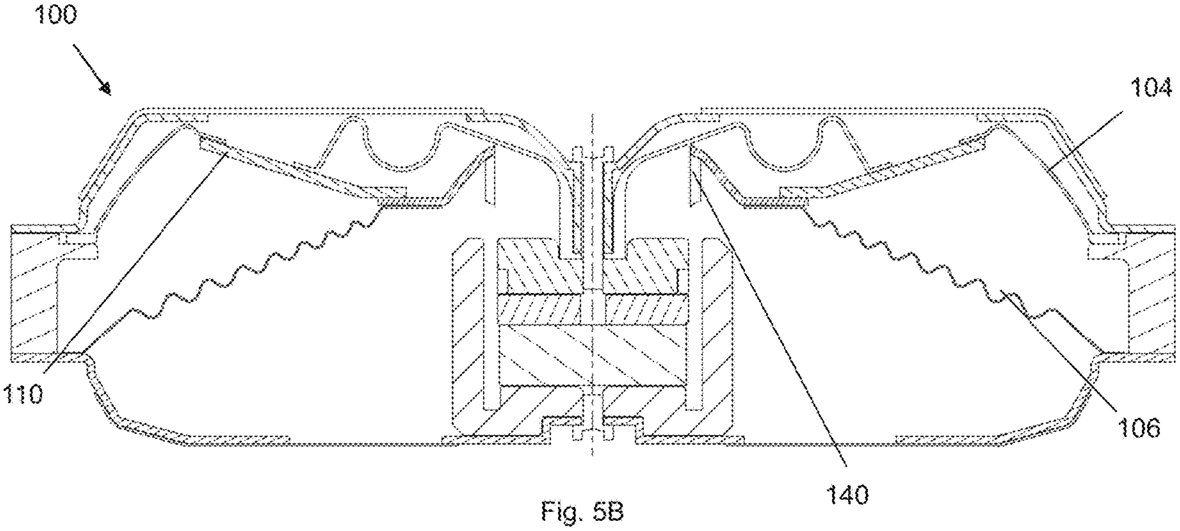
FIG. 5B is the loudspeaker of FIG. 5A, shown in cross section, with the diaphragm in its max forward position.
Figure 5C:
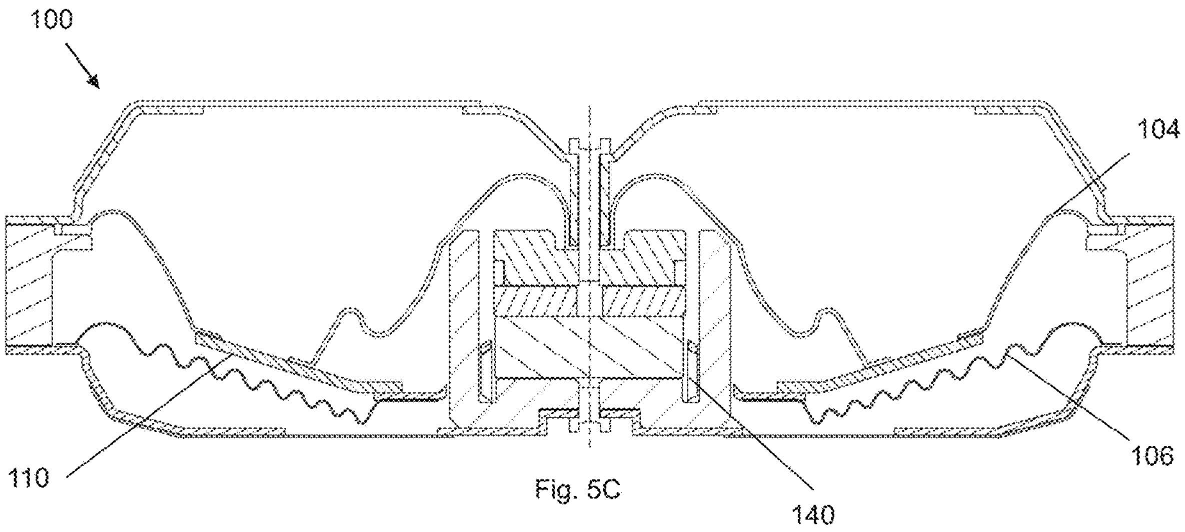
FIG. 5C is the loudspeaker of FIG. 5A, shown in cross section, with the diaphragm in its max backward position.

As shown by FIGS. 5A-5C, the loudspeaker 100 includes a diaphragm 110 having a front surface **110*a* facing in a forward direction 112 for producing sound to be radiated outwardly from the loudspeaker 100 in the forward direction 112 and a back surface 110*b* facing in a backward direction 114 that is opposite to the forward direction 112**.

The diaphragm 110 could be made e.g. out of paper.

The diaphragm 110 is suspended from a rigid frame 102 by one or more suspension elements, which in this case include a roll suspension 104 and a textile suspension 106 (e.g. spider). The roll suspension 104 attaches to the diaphragm 110 at locations on the diaphragm 110 that are radially outwards from locations at which the textile suspension 106 attaches to the diaphragm 110. The locations at which the roll suspension 104 attaches to the frame 102 are at locations along a longitudinal axis 103 of the loudspeaker 100 that are separated from the locations at which the textile suspension 106 attaches to the frame 102. Other suspension arrangements are possible.

As shown, the spider 106 has a gradually increasing roll height from its inner diameter to its outside diameter, i.e. the height of the corrugations in the spider 106 are smaller on connection to diaphragm 110 than on connection to the frame 102.

The loudspeaker 100 also includes a protective grille 108 that is attached to the frame 102 and serves to protect movable parts of the loudspeaker 100, such as the diaphragm 110.

The loudspeaker 100 also includes a magnet unit 120. The magnet unit 120 is most clearly illustrated in FIGS. 5D and 5E. In this example, the magnet unit 120 is cylindrical. The magnet unit 120 is configured to provide magnetic field in a magnetic gap 122, illustrated by hatched lines in FIG. 5E, wherein the magnetic gap 122 is located between a first portion 124 of the magnet unit 120, located radially inwards of the magnetic gap 122 with respect to a longitudinal axis 103 of the loudspeaker 100 and a second portion 126 of the magnet unit 120, located radially outwards of the magnetic gap 122 with respect to the longitudinal axis 103 of the loudspeaker 100.

In this example, the first portion 124 of the magnet unit 120 is a composite washer, formed of two individual sub-washers **124*a*, 124*b***. In this example, the composite washer 124 includes a cut out 125 in a side of the first sub-waster 124*a*, which is filled by a shorting ring 127.

In this example, the second portion 126 of the magnet unit 120 is part of a U yoke 128.

A single permanent magnet 130 provides the magnetic flux which is guided across the magnetic gap 122 by the other components (composite washer 124, U yoke 128) of the magnet unit 120.

As illustrated by FIGS. 6A(i) and 6A(ii), the presence of the cut out 125 in the composite washer 124 means that the magnetic flux density of the magnetic field in the magnetic gap 122 reaches a first local maximum at a first peak location P1 along the longitudinal axis 103 of the loudspeaker 100 and a second local maximum at a second peak location P2 along the longitudinal axis 103 of the loudspeaker 100, wherein the first peak location P1 and the second peak location P2 are separated spatially in the direction of the longitudinal axis 103 of the loudspeaker 100 by a valley region V in which the magnetic flux density is lower than both the first local maximum and the second local maximum.

The magnetic gap 122 extends from the first peak location P1 in a direction along the longitudinal axis 103 that leads away from the valley region V to a first drop off location D1, at which magnetic flux first drops off to 80% of the magnetic flux density at the first peak location P1.

The magnetic gap 122 also extend from the second peak location P2 in a direction along the longitudinal axis 103 that leads away from the valley region V to a second drop off location D2, at which magnetic flux first drops off to 80% of the magnetic flux density at the second peak location P2.

The magnetic gap thus extends from D1 to D2 and has a height that corresponds to D2-D1.

The magnetic gap 122 extends from the first peak location P1 in a direction along the longitudinal axis 103 that leads into the valley region V to a third drop off location D3, at which magnetic flux first drops off to 80% of the magnetic flux density at the first peak location P1.

The magnetic gap 122 also extend from the second peak location P2 in a direction along the longitudinal axis 103 that leads into the valley region V to a fourth drop off location D4, at which magnetic flux first drops off to 80% of the magnetic flux density at the second peak location P2.

For the depicted example, the locations D3, D4 are linked to the location of the cutout in the washer.

A skilled person would appreciate that, in use, the voice coil 140 in effect integrates magnetic flux lines over the height of the voice coil $H_v$, which results in the force factor named BL. When the voice coil 140 moves, the voice coil 140 will integrate flux over a different region of the magnetic flux profile. When we plot the force factor BL as a function of excursion (x=distance of the voice coil 140 from its rest position), and the resulting curve will be the BL(x) curve, an example of which as shown in FIG. 6A (iii).

The form of the force factor as a function of excursion BL(x) is for the presented magnet unit mainly defined by the height A (distance between D1 and D3 along the longitudinal axis), height B (distance between D3 and D4 along the longitudinal axis), height C (distance between D4 and D2 along the longitudinal axis) and voice coil height $H_v$.

The magnet unit is preferably configured such that the integrated magnetic flux through the voice coil windings is constant or close to constant (e.g. ±5%) in the linear excursion range. This results in a number of preferred arrangements in relation to the definition of these parameters:

For example, the voice coil height $H_v$ is preferably larger than height B.

For example, the voice coil height is preferably larger than the heights of the peak regions (i.e. height A and height C as shown in FIG. 6A(i)).

For example, the height of the valley region V is preferably chosen in such a way that the magnetic flux crossing the voice coil windings remains constant or close to constant (e.g. ±5%).

This is because if this distance V is too large, it will result in a valley in the BL(x) curve, yet if the distance is too small, it will result in a peak in the BL(x) curve. However, if the distance is well chosen, it will result in a desired plateau in the BL(x) curve as shown in FIG. 6A(iii). By way of example, if the coil moves from rest position in a forward direction—by let's say 1 mm—, the flux lines now crossing the top 1 mm part of the voice coil at the new position should have the same magnetic flux density as the bottom 1 mm flux lines when the coil was in the old (rest) position so that the total integrated flux density remains constant over excursion.

Figure 5D:
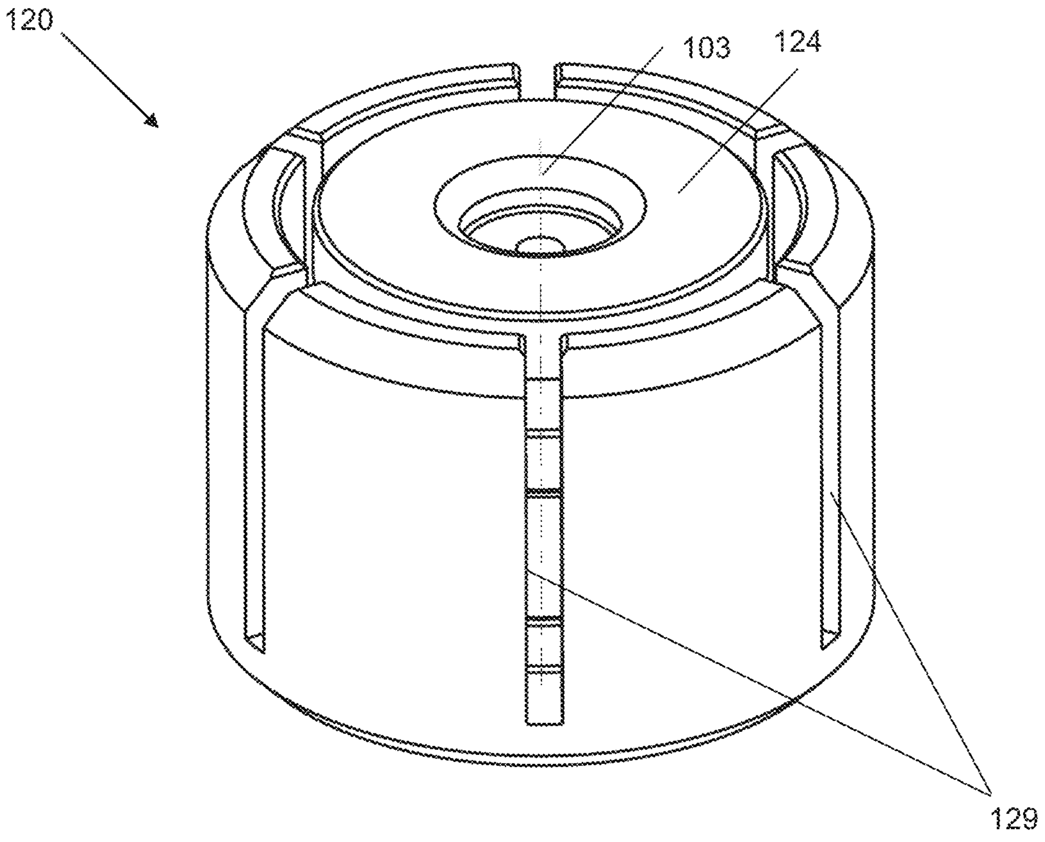
FIG. 5D is a magnet unit of the loudspeaker of FIG. 5A.
Figure 5E:
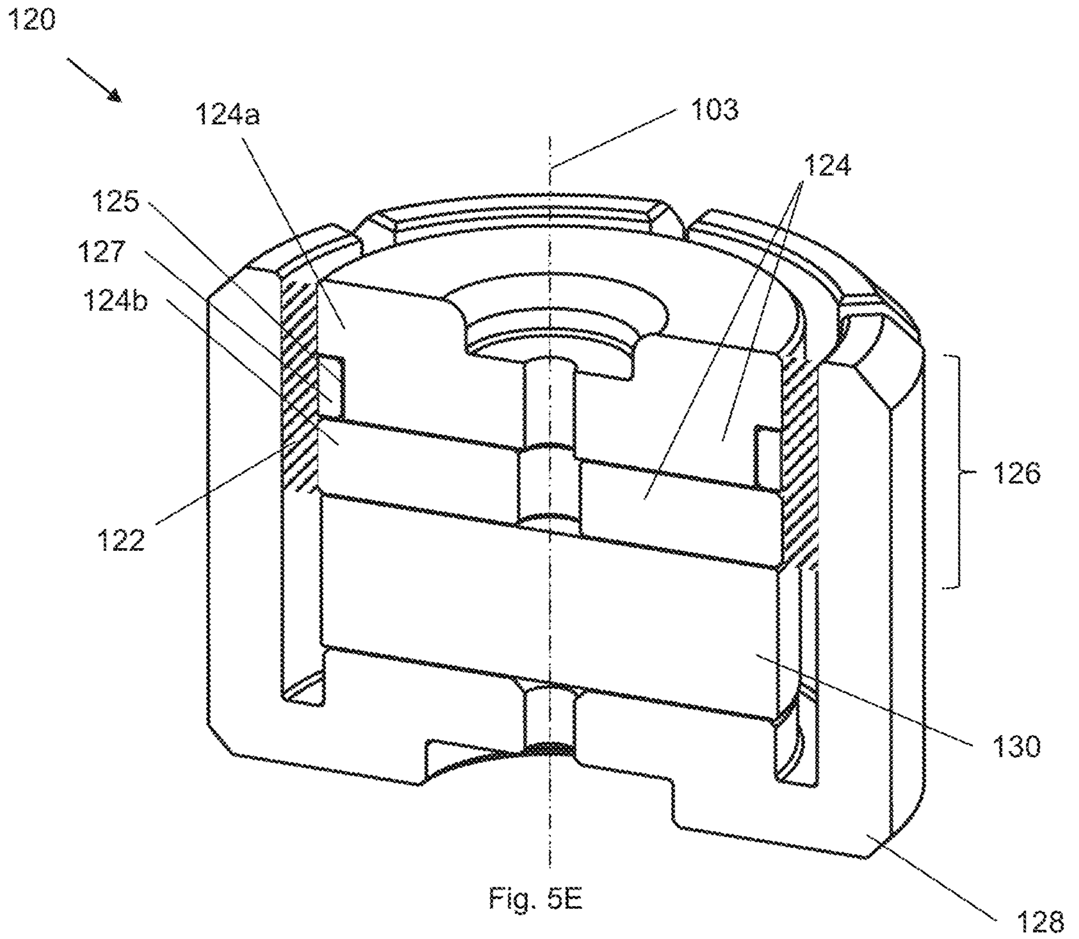
FIG. 5E is the magnet unit of FIG. 5D with a portion cut away.

As illustrated in FIG. 5D, the outer wall of the U yoke 128 includes slits 129 (the term "slits may be used interchangeably with "slots" herein) which extend in the direction of the longitudinal axis 103 of the loudspeaker 100.

The loudspeaker 100 also includes a voice coil 140, which is configured to sit in the magnetic gap 122 when the diaphragm 110 is in a rest position, and is further configured to produce a magnetic field in use (e.g. when energised by an electric current) which interacts with the magnetic field in the magnetic gap 122, provided by the magnet unit 120, so as to move the diaphragm 110 along the longitudinal axis 103 of the loudspeaker 100.

The height of the voice coil 140 in the direction of the longitudinal axis 103 of the loudspeaker 100 (10.1 mm in this example) is less than the height of the magnetic gap 122 in the direction of the longitudinal axis 103 of the loudspeaker 100 (17 mm in this example). Therefore, the loudspeaker 100 has an under hang voice coil arrangement.

The voice coil 140 is rigidly connected to the diaphragm 110 by a rigid connector 150, wherein the rigid connector 150 includes an inner portion 150*a* and an outer portion 150*b* joined together by ribs 152, wherein the inner portion 150*a* of the connector 150 is closer to the voice coil 140 than the outer portion 150*b* of the connector 150*b*. The ribs 152 extend radially outwardly from the voice coil 140 through the slits 129 in the second portion 126 of the magnetic unit 120, as shown by FIGS. 5H, 5I and 5J.

Figure 5F:
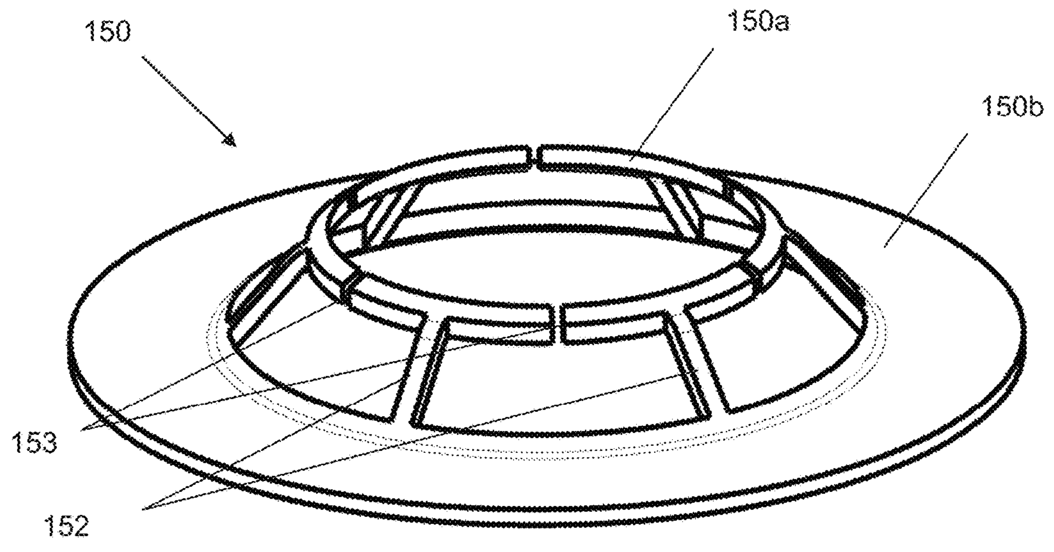
FIG. 5F is a rigid connector of the loudspeaker of FIG. 5A.

In this example, the inner portion 150*a* of the rigid connector 150 includes circumferentially distributed gaps 153, as shown by FIG. 5F. This is because, in this example, the rigid connector 150 is made of an electrically conductive material and the part of this connector 150 which is crossing magnetic field lines is therefore preferably interrupted in the circumference (not a complete circle) in order to reduce/avoid Foucault currents in the coupling element.

The voice coil 140 is configured to be positioned in the valley region V when the diaphragm 110 is in its rest position.

In this particular example, the voice coil 140 has four winding layers 144, the wire from which these layers are formed having a circular cross section.

Figure 5G:
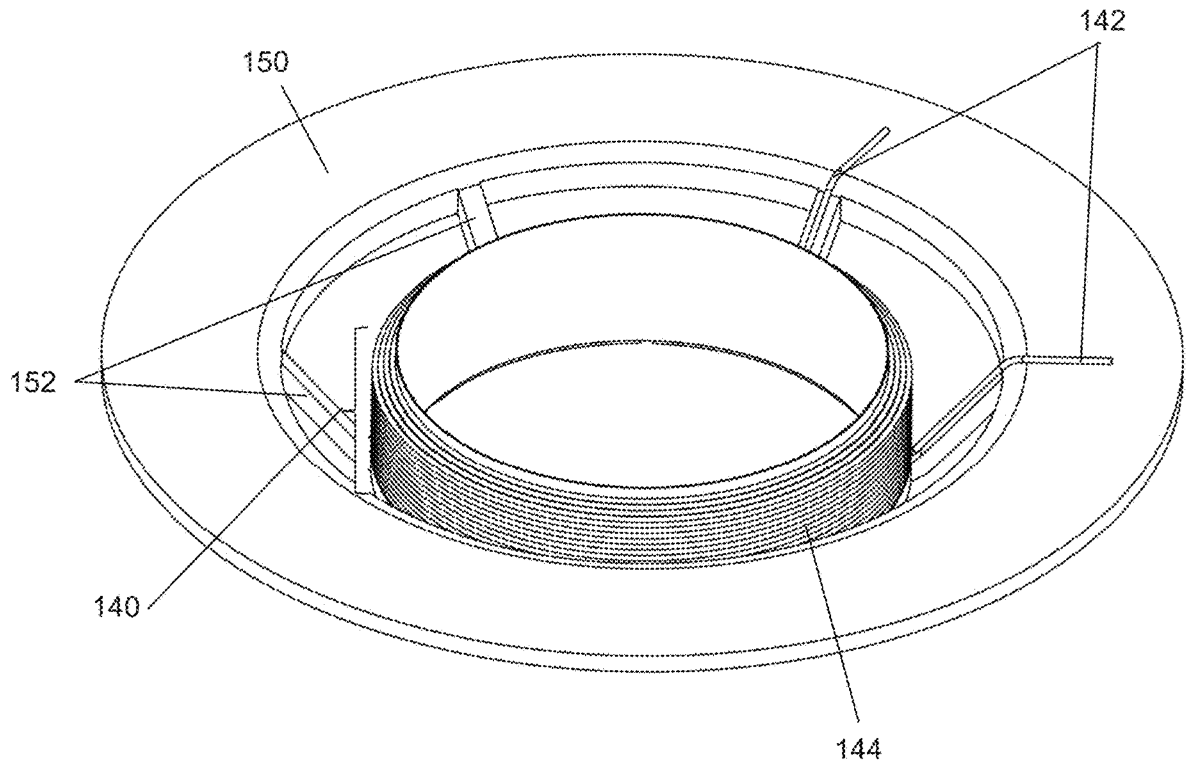
FIG. 5G shows the underside of the rigid connector of FIG. 5F, with a voice coil attached to the rigid connector.
Figure 5H:
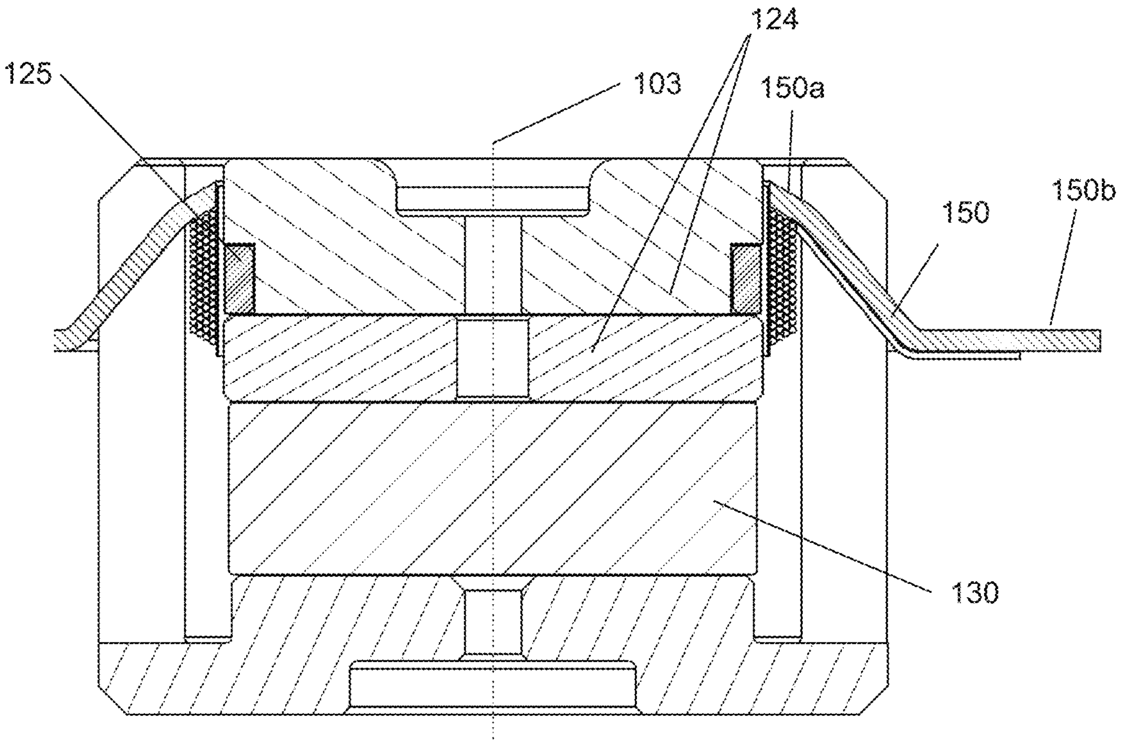
FIG. 5H is a cross section through the loudspeaker of FIG. 5A showing the voice coil in the magnetic gap of the loudspeaker of FIG. 5A.
Figure 5I:
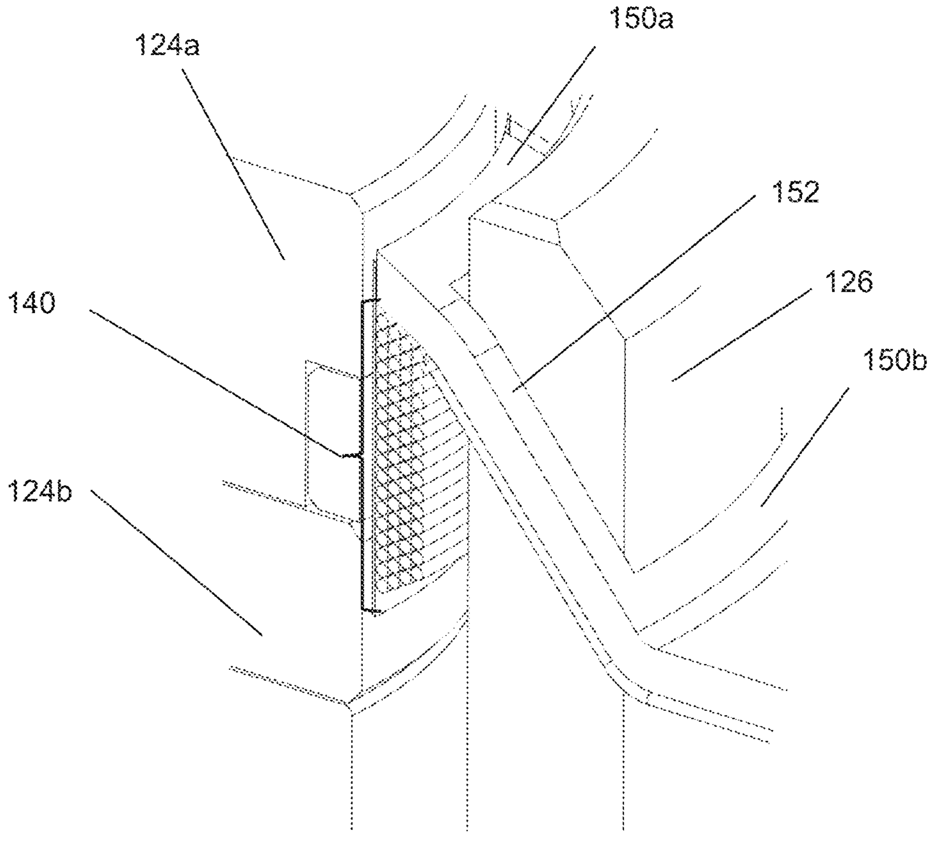
FIG. 5I is a perspective cut away view showing the voice coil in the magnetic gap of the loudspeaker of FIG. 5A.
Figure 5J:
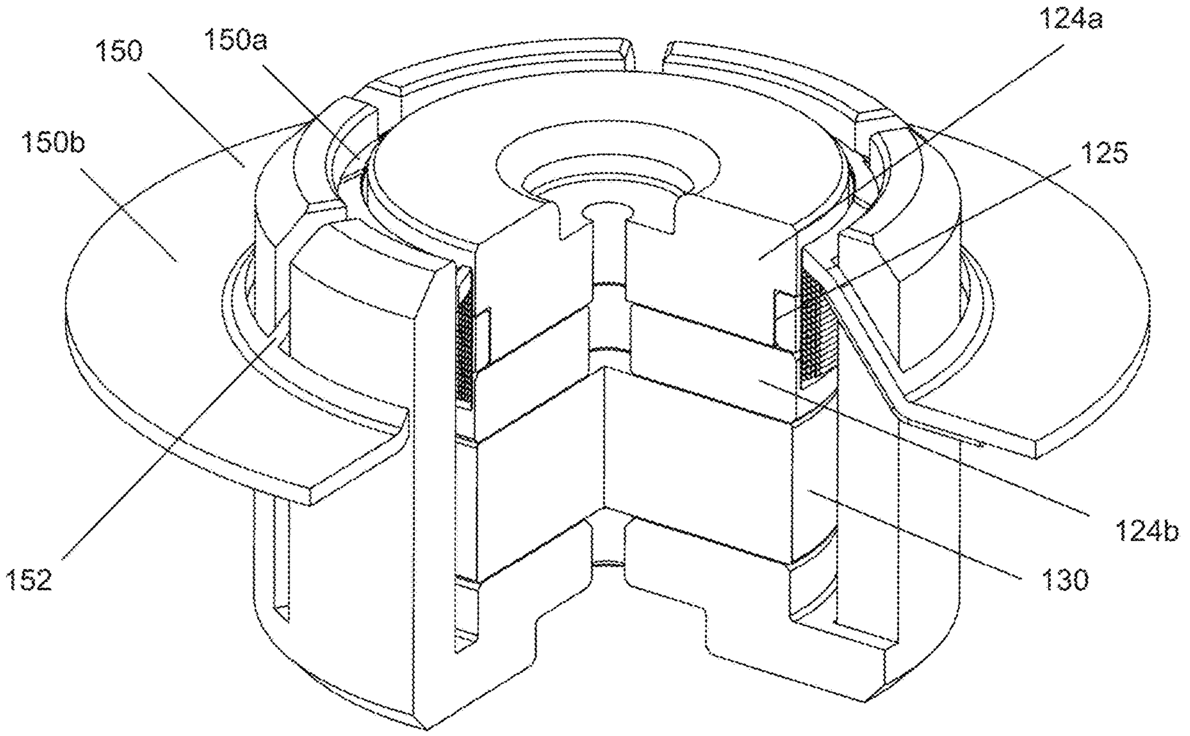
FIG. 5J is a perspective cut away view showing the magnet unit, rigid connector and voice coil of the loudspeaker of FIG. 5A.

Lead wires 142 for the voice coil 140 can be seen in FIG. 5G, which shows the underside of the voice coil 140 and the connector 150. The lead wires 142 connect the voice coil 140 to an electric current supply.

Figure 5K:
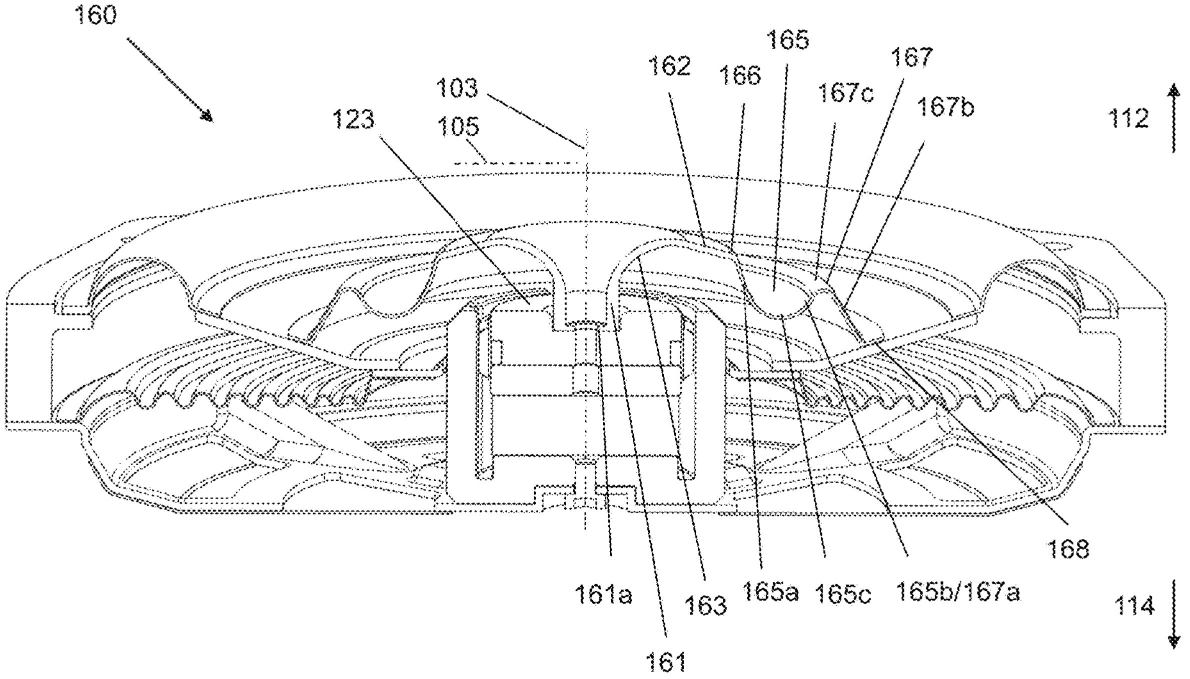
FIG. 5K is a perspective cut away view showing the loudspeaker of FIG. 5A, with the diaphragm in its rest position.

As shown by FIG. 5K, the loudspeaker 100 includes a flexible dustcap 160 similar to that described in unpublished PCT application PCT/EP2018/084048, extracts from which are incorporated in the description and drawings of this application (see below). Any one or more features as described by the extracts of PCT/EP2018/084048 as contained herein may be incorporated into a loudspeaker according to the present invention.

Various features and properties of the flexible dustcap 160 are described with reference to when the diaphragm 110 is in its rest position, since other positions of the diaphragm 110 may cause the flexible dustcap 160 to deform.

As shown by FIG. 5K, the flexible dustcap 160 may include an upstanding portion 161 which extends around the longitudinal axis 103 of the loudspeaker 100 and which, when viewed in a cross-section taken along the longitudinal axis 103 of the loudspeaker 100, extends in the forwards direction 112 from the attachment surface on the front surface 123 of the magnet unit 120, preferably at an angle that is no more than 30° with respect to the longitudinal axis 103 of the loudspeaker 100, though larger angles may be possible if the upstanding portion 161 is adequately stiff. The upstanding portion 161 may attach to the attachment surface directly, or via an (optional) inner attachment portion 161*a* of the flexible dustcap 160. The upstanding portion 161 may help to create a distance (in the direction of the longitudinal axis 103) between the front surface 123 of the magnet system 120 and the start of an outwardly extending portion 162 of the flexible dustcap 160 (described below). To achieve this function, the upstanding portion 161 may be stiffer than other regions of the flexible dustcap 160. Such stiffness may be achieved by the outwardly extending portion 162 having a thickness that is larger than some other regions of the flexible dustcap 160, or by adding additional stiffening material in this region of the flexible dustcap 160.

Although in this example, the attachment surface is on the front surface 123 of the magnet unit 120, the attachment surface could be located on other elements of the loudspeaker (e.g. the frame of the loudspeaker) though the attachment surface is preferably fixed with respect to the magnet unit 120.

The flexible dustcap 160 may include an outwardly extending portion 162 which extends around the longitudinal axis 103 of the loudspeaker 100 and which, when viewed in a cross-section taken along the longitudinal axis 103 of the loudspeaker 100, extends radially outwards from the upstanding portion 161 relative to the longitudinal axis 103 of the loudspeaker 100. The outwardly extending portion 242 may, when viewed in a cross-section taken along the longitudinal axis 103 of the loudspeaker 100, form an angle that is no more than 20° with respect to a radial axis 105 that extends radially outwardly from and is perpendicular to the longitudinal axis 103 of the loudspeaker 100. The outwardly extending portion 162 is preferably adequately stiff and resists bending in use in order to create space for the voice coil 140 when the diaphragm 110 is at its maximum extent in the forward direction 112. Such stiffness may be achieved by the outwardly extending portion 162 having a thickness that is larger than some other regions of the flexible diaphragm 110, or by adding additional stiffening material in this region of the flexible dustcap 160.

The upstanding portion 161 may be joined to the outwardly extending portion 162 by a bend 163 in the flexible dustcap 160, wherein the bend 163 extends around the longitudinal axis 103 of the loudspeaker 100. The bend 163, when viewed in a cross-section taken along the longitudinal axis 103 of the loudspeaker 100, preferably has a smoothly changing curvature, rather than being a sharp fold or corner in the flexible dustcap 160. The bend 163 may allow the outwardly extending portion 162 to move forwards and backwards with movement of the diaphragm 110.

The flexible dustcap 160 may include a first corrugation 165 which extends around the longitudinal axis 103 of the loudspeaker 100. The first corrugation 165, when viewed in a cross-section taken along the longitudinal axis 103 of the loudspeaker 100, may form a ridge or furrow in the flexible dustcap 160 (the first corrugation 165 as oriented in FIG. 5K may be viewed as forming a furrow). The first corrugation 165 may, when viewed in a cross-section taken along the longitudinal axis 103 of the loudspeaker 100, include two arms 165*a*, 165*b* which join at a base 165*c*, e.g. to form a "U" shape or a "V" shape (preferably a "U" shape as shown in FIG. 5K). Preferably the first corrugation 165 is oriented with its base 165*c* facing in the backward direction 114 (as shown in FIG. 5K). One arm (preferably the radially innermost arm 165*a*) of the first corrugation 165 may be joined to the outwardly extending portion 162, preferably via a non-smoothly changing fold 166 (e.g. a sharp fold or corner) in the flexible dustcap 160. In some examples, the radially innermost arm 165*a* of the first corrugation 165 may form an angle that is no more than 20° with respect to the longitudinal axis 103 of the loudspeaker 100. The radially innermost arm 165*a* of the first corrugation 165 may allow the flexible dustcap 160 to get closer to the diaphragm 110 and may be configured to roll off when the diaphragm 110 is at maximum mechanical excursion in the backward direction 114.

The flexible dustcap 160 may include a second corrugation 167 which extends around the longitudinal axis 103 of the loudspeaker 100. The second corrugation 167, when viewed in a cross-section taken along the longitudinal axis 103 of the loudspeaker 100, may form a ridge or furrow in the flexible dustcap 160 (the second corrugation 167 as oriented in FIG. 5K may be viewed as forming a ridge). The second corrugation 167 may, when viewed in a cross-section taken along the longitudinal axis 103 of the loudspeaker 100, include two arms 167*a*, 167*b* which join at a base 167*c*, e.g. to form a "U" shape or a "V" shape (preferably a "U" shape as shown in FIG. 5K). Preferably the second corrugation 167 is oriented with its base 167*c* facing in the forward direction 112 (as shown in FIG. 5K). One arm (preferably the radially innermost arm 167*a*) of the second corrugation 167 may also be the radially outermost arm 165*b* of the first corrugation 165. One arm (preferably the radially outermost arm 167*b*) of the second corrugation 167 may attach to the front surface 110*a* or back surface 110*b* of the diaphragm 110, e.g. directly, or via an (optional) outer attachment portion 168 of the flexible dustcap 160. In some examples, the radially outermost arm 167*b* of the second corrugation 167 may form an angle that is no more than 20° with respect to the longitudinal axis 103 of the loudspeaker 100. The radially outermost arm 167*b* of the second corrugation 167 may be configured to roll off when the diaphragm 110 is at maximum mechanical excursion in the forward direction 112.

The first and second corrugations 165, 167 are preferably configured to bend in the forward 112 and backward 114 directions during movement of the diaphragm 110 in the forward 112 and backward 114 directions.

The flexible dustcap 160 may be a single piece of rubber.

Although not shown in the figures, the upstanding portion 241 may be slightly thicker than the bend 243, which is in turn may be slightly thicker than the outwardly extending portion 242, with the thickness of the outwardly extending portion 242 optionally being thicker than the first and second corrugations 245, 247 (which may e.g. have the same thickness as each other). These relative thicknesses may help the different portions of the flexible dustcap 160 to have different stiffnesses so that the portions function as described above.

It is noted for completeness that the upstanding portion 241, the bend 243, the outwardly extending portion 242 and the radially innermost arm 245*a* of the first corrugation 245 can together be seen as forming a further (third) corrugation (which, as oriented in FIG. 5K may be viewed as forming a ridge) in the flexible dustcap 160.

The flexible dustcap 160 of the loudspeaker 100 is capable of significantly reducing the height of a loudspeaker 100 when the diaphragm is at its maximum extent in the forward direction compared with other designs.

As shown in FIG. 5A, a front surface of the magnet unit 120, specifically the forwardmost surface of the composite washer 124, includes an additional cut-out on its front surface to facilitate attachment of the flexible dustcap 160 to the magnet unit 120.

FIGS. 5A-C respectively show the diaphragm 110 in its rest, max forward position and max backward position, and shows that the diaphragm has a very large max mechanical excursion for its size.

Comparison Data

Table 1, below shows the total stack up height of different loudspeaker topologies with the following fixed example parameters for all columns:

Maximum mechanical excursion (X mech)=20 mm

Yoke thickness=6 mm

Maximum linear excursion (excursion where BL drops to 82% of the BL at rest position)=8.3 mm

TABLE 1

Total stack up height of different loudspeaker topologies

| WO2004/017674 | | US9025809 | | EP09779592 (FIG. 2) underhung | | EP1137320 (FIG. 15) assumed underhung | | EP1137320 (FIG. 15) Equal hung | | Invention | |
|---|---|---|---|---|---|---|---|---|---|---|---|
| Yoke bottom thickness (6a) | 6 | Yoke bottom thickness (71) | 6 | Yoke bottom thickness (32) | 6 | Yoke bottom thickness 23 | 6 | Yoke bottom thickness | 6 | bottom thickness | 6 |
| Mechanical excursion (6b to 6a in axial direction) | 20 | Mechanical excursion (71 to 58/30 in axial direction) | 20 | Mechanical excursion (218 to 232 in axial direction) | 20 | Mechanical excursion (23 to 9a in axial direction) | 20 | Mechanical excursion | 20 | xmech | 20 |
| Coil overhang (height windings 6b-gap/washer height)/2 | 8 | Coil overhang (height windings 30-gap/washer 78 height)/2 | 8 | coil height required for underhung | 10.5 | coil height required for underhung (height of 9a) | 10.5 | washer height = coil height | 36 | coil height split gap | 10.1 |
| Gap height (washer height) | 5 | Gap height (washer height 78) | 5 | Coil underhang (top 218 to top 246 in axial direction) | 5 | coil underhang (top 9a to top 3 in axial direction) | 5 | Mechanical excursion | 20 | split gap top to coil top | 3 |
| Mechanical excursion | 20 | (Opposition magnet (76)) | 0 | mech excursion | 20 | Mechanical excursion (top 3 to bottom 18) | 20 | Mechanical coupling thickness (thickness part 22) | 2 | mechanical excursion | 20 |
| Mechanical coupling thickness (thickness part 22) | 2 | Mechanical excursion | 20 | edge unrolling | 10 | thin plate thickness (18) | 0.5 | Mechanical excursion | 20 | G | 3 |
| Mechanical excursion | 20 | Additional height (marked with '7' on the drawing) | 2 | | | Mechanical excursion | 20 | | | | |
| | | Mechanical excursion | 20 | | | membrane height exceeding height of element 18, assumed | 0 | | | | |
| Total height | 81 | Total height | 81 | Total height | 71.5 | Total height | 82 | Total height | 104 | Total height | 62.1 |

Note: "axial direction" may be used herein to refer to the longitudinal direction.

Column 1 of this table shows the stack up height of the design of WO2004/017674 (as shown in FIG. 1 of the present disclosure). This is a design where the voice coil is coupled over the magnet system to the diaphragm by a mechanical coupler. The voice coil is an overhang design. The total stack up height of this design is 81 mm.

Figure 2:
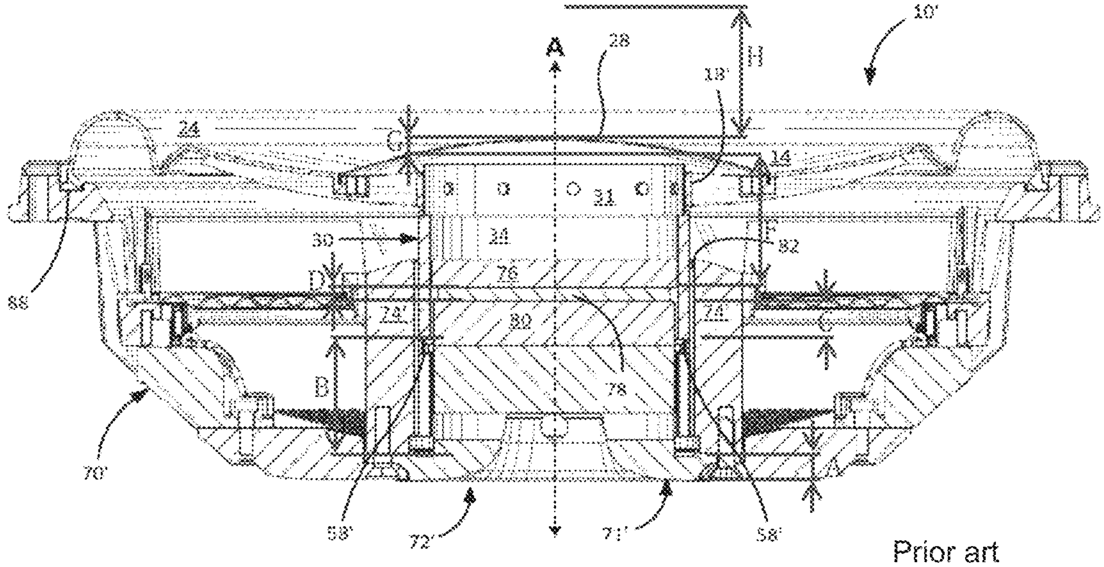
FIG. 2 is a marked-up version of FIG. 5 of U.S. Pat. No. 9,025,809.

Column 2 of this table shows the stack up height of the design of U.S. Pat. No. 9,025,809 (as shown in FIG. 2 of the present disclosure). This is a design where the voice coil is coupled above and partly through the magnet system to the diaphragm by a mechanical coupler. Additionally, the damper is coupled through the magnet system to the bottom of the voice coil. The voice coil is an overhang design. The total stack up height of this design is 81 mm.

Figure 3:
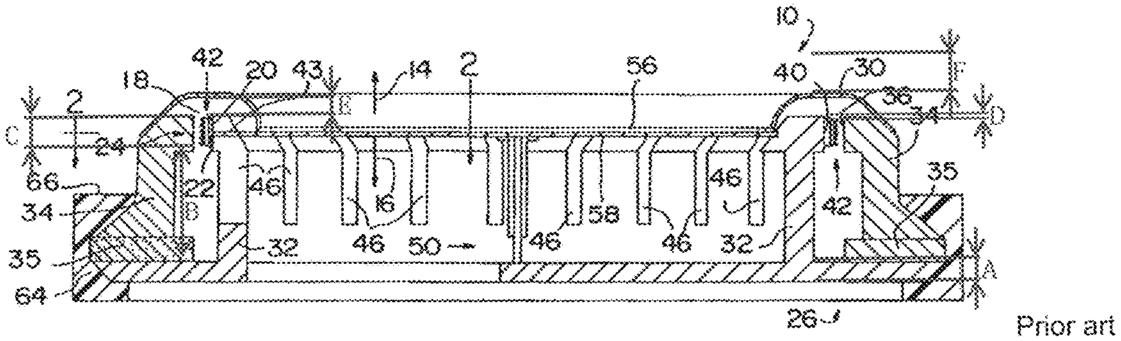
FIG. 3 is a marked-up version of FIG. 1 of EP0979592B1.

Column 3 of this table shows the stack up height of the design of EP09779592B1 (as shown in FIG. 3 of the present disclosure). This is a design where the voice coil is coupled through the magnet system to the cone by a mechanical coupler. Additionally, an edge with a single radius is added to seal the diaphragm from the front to the back. As the radius of the edge needs to be large in order to allow for excursion, this adds to the stack up height. The voice coil is an under hang design. The total stack up height of this design is 71.5 mm.

Figure 4:
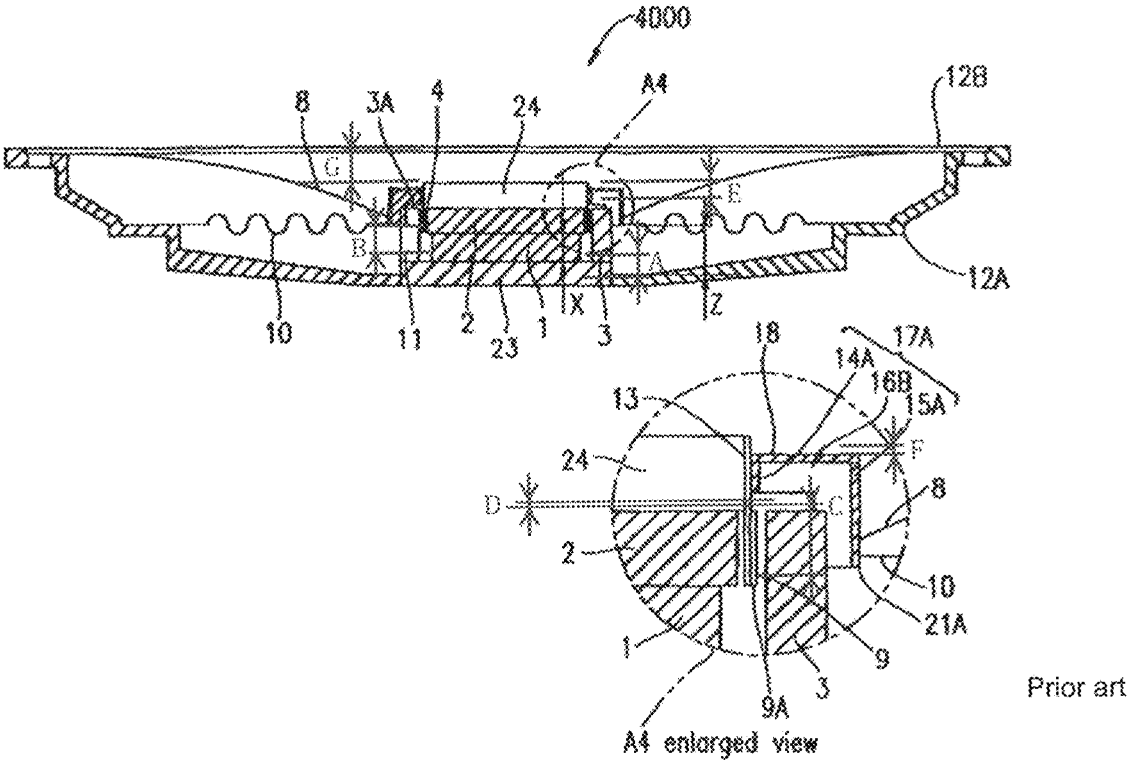
FIG. 4 is a marked-up version of FIG. 15 of EP1137320A2.
Figure 15:
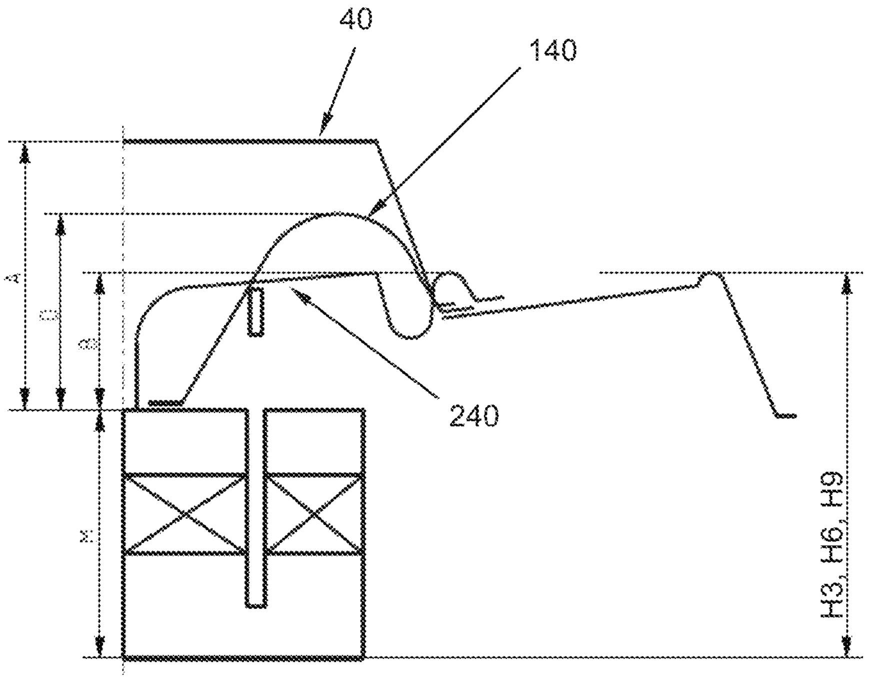
FIG. 15 provides a comparison between the heights of the dustcaps of the loudspeakers 1, 101, 201 of FIGS. 7, 9 and 11 above the front surface of the magnet unit when the diaphragm is at its maximum extent in the forward direction.

Column 4 of this table shows the stack up height of the design of FIG. 15 of EP1137320A2 (as shown in FIG. 4 of the present disclosure) whilst assuming an under hung arrangement. This is a design where the voice coil is coupled through the magnet system to the cone by a mechanical coupler. Additionally, a thin plate is added to seal the diaphragm from the front to the back. The loudspeaker is assumed here to have an under hang design. The total stack up height of this design is 82 mm.

Column 5 shows the stack up height of the design of FIG. 15 of EPI 137320A2 (as shown in FIG. 4 of the present disclosure) whilst assuming an equal hang arrangement. This is a design where the coil is coupled through the magnet system to the cone by a mechanical coupler. Additionally, a thin plate is added to seal the diaphragm from the front to the back. The loudspeaker is assumed here to have an equal hang design as an alternative to column 4, in order to verify the effect on stack up height. The total stack up height of this design is 104 mm.

Column 6 shows the stack up height of the design of the loudspeaker of FIG. 5A. This is a design where the voice coil is coupled through the magnet unit to the cone by a mechanical coupler. Additionally, a deformable dustcap is added to seal the diaphragm from the front to the back. The deformable dustcap only adds a height increase when in a forward position of a factor "G", as described in PCT/EP2018/084048, extracts from which are incorporated in the description and drawings of this application (see below). The loudspeaker has 2 distinct peaks in the magnetic flux profile, combined with a short winding height voice coil which is positioned between and partly inside the 2 peaks in the magnetic flux.

It can be seen from this table that the described invention leads to the shallowest speaker design for an equal performance (read: low frequency reproduction). The total stack up height of this design is 62.1 mm It can also be seen from this table that the prior art designs which are based on a slotted magnet system—in order to save height—are still significantly higher than the described invention.

Variants

Variants of the example loudspeaker shown in FIG. 5A may include:

- Use of 2 winding layers 144 in the voice coil 140 (though other numbers are possible, and multiples of two are preferred)
- Use of one or more rectangular winding layers 144 (winding layers formed from wire having a rectangular cross section) in the voice coil 140
- A diaphragm 110 whose height+the unrolling of the edge 104 in outward direction does not exceed the height of the flexible dustcap 160 in an outward direction. (see FIG. 5B) (if the height of diaphragm 110 would be excessive, the advantage of the flexible dustcap 160 may be lessened).
- Having a textile suspension 106 outer diameter which is at least 0.8× the diaphragm 110 diameter, meaning that the suspension part 106 is preferably be sufficiently large, e.g. 0.8× the diameter of part 110. If this would not be the case, the total stack up height may increase.
- The lead wire connection 142 from an electric current supply and to the voice coil 140 could be routed over the roll suspension 104
- The lead wire connection 142 from an electric current supply and to the voice coil 140 could be routed over the diaphragm 110
- The rigid connector 150 could include two or more electrically conductive parts which are used to provide an electrical connection to the voice coil 140, optionally in combination with a third non-conductive (e.g. plastic) element which couples the two conductive parts
- The magnet system may use an outlying magnet instead of or in addition to the inlying permanent magnet 130 described herein
- The diaphragm 110 may be made out of various materials such as cellulose based material, formed plastics, sheet metal, a sandwich structure of multiple layers, fibre based material and/or foam
- The rigid connector 150 could be perforated for air management reasons
- The rigid connector 150 could be made of an electrically non-conductive material with inset molded connections to provide an electrical connection to the voice coil 140
- The rigid connector 150 could be made of an electrically non-conductive material with printed conductive tracks to provide an electrical connection to the voice coil 140
- The textile suspension 106 may be perforated for air management reasons
- The lowest part of the voice coil 140 may be higher than the lowest part of the rigid coupler 150, since this helps to reduce height
- The rigid coupler 150 could be integrally formed with the diaphragm 110
- The textile suspension 106 could be replaced by another roll suspension which could provide symmetry, though should be separated by an adequate distance to provide stability
- The roll suspension 104 may be replaced by a textile suspension
- The suspension may consist solely of the diaphragm edge and the flexible dustcap, i.e. no textile suspension 106

Example Applications

By way of example, the loudspeaker 100 shown in FIG. 5A could be used in:

- Automotive applications. E.g. hatshelf speaker, shallow midrange loudspeaker, under seat subwoofer, infinite baffle loudspeaker, door mounted loudspeaker, footrest located subwoofer, headreast applications, nearfield applications, fullrange nearfield applications . . .
- Consumer applications: E.g. shallow subwoofers below seats, in wall loudspeaker, loudspeakers integrated in TV sets
- PA & fixed install applications. E.g. shallow subwoofers, subwoofers for line arrays, special format subwoofers Final Remarks The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventor does not wish to be bound by any of these theoretical explanations.

Any section headings used herein are for organizational purposes only and are not to be construed as limiting the subject matter described.

Throughout this specification, including the claims which follow, unless the context requires otherwise, the word “comprise” and “include”, and variations such as “comprises”, “comprising”, and “including” will be understood to imply the inclusion of a stated integer or step or group of integers or steps but not the exclusion of any other integer or step or group of integers or steps.

It must be noted that, as used in the specification and the appended claims, the singular forms “a,” “an,” and “the” include plural referents unless the context clearly dictates otherwise. Ranges may be expressed herein as from “about” one particular value, and/or to “about” another particular value. When such a range is expressed, another embodiment includes from the one particular value and/or to the other particular value. Similarly, when values are expressed as approximations, by the use of the antecedent “about,” it will be understood that the particular value forms another embodiment. The term “about” in relation to a numerical value is optional and means for example +/−10%.

REFERENCES

A number of publications are cited above in order to more fully describe and disclose the invention and the state of the art to which the invention pertains. Full citations for these references are provided below. The entirety of each of these references is incorporated herein.

WO2004/017674
U.S. Pat. No. 9,025,809
EP0979592B1
EP1137320A2
U.S. Pat. No. 5,883,967

PCT/EP2018/084048 is also referred to herein, though it is not published at the time of filing. Extracts from PCT/EP2018/084048 are incorporated in the description and drawings of this application (see below).

ANNEX—EXTRACTS FROM PCT/EP2018/084048

These extracts are from PCT application PCT/EP2018/084048, which are included to provide a more detail regarding the flexible dustcap described above. In these extracts, the figures have been renumbered to avoid conflict with the other figures in this patent application, and the claims have been relabelled as “statements” to avoid confusion with the claims of this patent application.

SUMMARY OF THE INVENTION

In a first aspect, the present invention may provide:

A loudspeaker including:

- a diaphragm having a front surface facing in a forward direction for producing sound to be radiated outwardly from the loudspeaker in the forward direction and a back surface facing in a backward direction that is opposite to the forward direction;
- a magnet unit configured to provide magnetic field in a predetermined region of space;
- a voice coil rigidly connected to the diaphragm, wherein the voice coil is configured to produce a magnetic field in use which interacts with the magnetic field provided by the magnet unit in the predetermined region of space so as to move the diaphragm along a longitudinal axis of the loudspeaker;
- a flexible dustcap attached to the diaphragm and an attachment surface of the loudspeaker that is fixed with respect to the magnet unit and is located radially inwards of the voice coil relative to the longitudinal axis of the loudspeaker.

By using a flexible dustcap as described above, the present inventor has found that the height of a loudspeaker with the diaphragm at its maximum extent in the forward direction can be reduced compared with a situation in which a more conventional rigid dustcap is used.

Preferably, the flexible dustcap includes more than one corrugation.

The present inventor has found that a loudspeaker with reduced height can most effectively be achieved if there is more than one corrugation in the flexible dustcap.

For the purposes of this disclosure, the term “corrugation” being used with respect to an element can be understood as a ridge or a furrow formed in the element. Each corrugation (e.g. ridge or furrow) included in the flexible dustcap may extend around the longitudinal axis of the loudspeaker, e,g, in a circumferential direction with respect to the longitudinal axis of the loudspeaker.

The longitudinal axis may extend through a central region of the loudspeaker, preferably through a centre of the voice coil. If the diaphragm is rotationally symmetric, the longitudinal axis may pass through the rotational axis of symmetry of the diaphragm.

The diaphragm may be configured to be moved along the longitudinal axis from a nominal position (e.g. a rest position, which may be the position the diaphragm is in when the voice coil does not have a current passing through it) up to a maximum extent in the forward direction and a maximum extent in the backward direction.

The flexible dustcap is preferably configured to allow the diaphragm to be moved along the longitudinal axis from a nominal position up to a maximum extent in the forward direction and a maximum extent in the backward direction without the flexible dustcap contacting the magnet unit or the voice coil in use.

The predetermined region of space (in which the magnet unit is configured to provide magnetic field) may be an air gap located between two components of the magnet unit. One of the two components may be located radially inwards of the voice coil relative to the longitudinal axis of the loudspeaker, with the other of the two components being located radially outwards of the voice coil of the magnet unit. One or both of the two components may be a permanent magnet. One or both of the two components may be a magnetic field guiding element, e.g. of steel. The magnetic field guiding element(s) may act to guide a magnetic field produced by a permanent magnet included in the magnet unit (the permanent magnet may be, but need not be, one of the two components). Preferably, the component located radially inwards of the voice coil is a permanent magnet. Preferably the component located radially outwards of the voice coil is a magnetic field guiding element, since magnetic field guiding elements can in general be made thinner than a permanent magnet, which may help to simplify the design of the loudspeaker.

The voice coil may be configured to produce a magnetic field when an electric current is passed through it in use, wherein the magnetic field produced by the voice coil interacts with the magnetic field provided by the magnet unit in the predetermined region of space so as to move the diaphragm forwards and backwards along a longitudinal axis of the loudspeaker. The electric current passed through the voice coil may be configured to move the voice coil in a predetermined frequency range, e.g. a bass frequency range.

The voice coil may be rigidly connected to the diaphragm via a rigid connector. The rigid connector may e.g. be attached to the voice coil and the diaphragm.

In some examples, the rigid connector may include ribs which extend through slits in the component located radially outwards of the voice coil (of the two components between which the air gap is located). The slits may extending in the direction of the longitudinal axis. There may be three or more ribs, and three or more slits, e.g. where each rib extends through a respective slit. Such an arrangement may be based on principles described e.g. in U.S. Pat. No. 5,081,684.

In some examples, the rigid connector may be a voice coil former. The voice coil former may be a tube on which the voice coil is mounted.

The flexible dustcap is preferably configured to prevent dust (or other foreign particles) from entering into the predetermined region of space (e.g. air gap).

The diaphragm may include a hole, e.g. to accommodate a magnet unit (as shown in FIG. 5) or to allow the diaphragm to be more easily attached to the voice coil, e.g. via a rigid connector such as a voice coil former.

The loudspeaker may include a frame. The magnet unit may be attached to the frame (directly or indirectly) such that the magnet unit is fixed with respect to the frame. The diaphragm may be suspended from the frame via one or more suspension elements. The one or more suspension elements may include a roll suspension (e.g. a half-roll edge suspension) which extends (preferably continuously) around an outer edge of the diaphragm. The one or more suspension elements may include a spider which connects to the diaphragm (directly, or via another element such as a rigid connector) at a region of the diaphragm that is radially inwards of the outer edge of the diaphragm with respect to the longitudinal axis of the loudspeaker. A spider is typically a ring of textile material.

The loudspeaker may be a low-profile loudspeaker, e.g. having a height in the direction of the longitudinal axis of the loudspeaker from a forward-most surface to a backward-most surface of the loudspeaker when the diaphragm is at its maximum extent in the forward direction of 90 mm or less, more preferably 75 mm or less, more preferably 65 mm or less. Such a height may be achievable even if the distance in the direction of the longitudinal axis through between the maximum extent in the forward direction and the maximum extent in the backward direction of the diaphragm (referred to as “peak to peak excursion distance”, below) is 20 mm or more, 30 mm or more, or even 40 mm or more.

These figures are achievable since using a flexible dustcap as disclosed herein, the present inventor was able to make a loudspeaker having a height of ~65 mm with a peak to peak excursion of ~40 mm.

Herein, a reference to a distance in the direction of the longitudinal axis between two different positions of the diaphragm may be understood as referring to the minimum distance in the direction of the longitudinal axis through which the diaphragm must be moved in order to get from one position to the other.

The attachment surface of the loudspeaker that is fixed with respect to the magnet unit may be a surface of the magnet unit, or a surface on a frame of the loudspeaker that is fixed with respect to the magnet unit. In some examples, the attachment surface may be a front surface of the magnet unit, which faces in the forward direction.

For avoidance of any doubt, the flexible dustcap could, for example, attach to the front surface or the back surface of the diaphragm (or even a side surface of the diaphragm). The flexible dustcap could potentially attach to the diaphragm indirectly, e.g. via an intermediate element, through the flexible dustcap preferably attaches directly to the diaphragm.

Some optional features of the flexible dustcap will now be described, which may be described with reference to the diaphragm being in its nominal position (since other positions of the diaphragm may cause the flexible dustcap to deform).

The flexible dustcap may (e.g. when the diaphragm is in its nominal position) include an upstanding portion which extends around the longitudinal axis of the loudspeaker (e.g. in a circumferential direction with respect to the longitudinal axis) and which, when viewed in a cross-section taken along the longitudinal axis of the loudspeaker, extends in the forwards direction from the attachment surface of the loudspeaker, preferably at an angle that is no more than 30°, more preferably an angle that is no more than 20°, with respect to the longitudinal axis of the loudspeaker. The upstanding portion may attach to the attachment surface of the loudspeaker, directly or indirectly, e.g. via an (optional) inner attachment portion of the flexible dustcap.

The flexible dustcap may (e.g. when the diaphragm is in its nominal position) include an outwardly extending portion which extends around the longitudinal axis of the loudspeaker (e.g. in a circumferential direction with respect to the longitudinal axis) and which, when viewed in a cross-section taken along the longitudinal axis of the loudspeaker, extends radially outwards from the upstanding portion relative to the longitudinal axis of the loudspeaker. The outwardly extending portion may, when viewed in a cross-section taken along the longitudinal axis of the loudspeaker, form an angle that is no more than 20° with respect to a radial axis that extends radially outwardly from and is perpendicular to the longitudinal axis of the loudspeaker.

The upstanding portion may (e.g. when the diaphragm is in its nominal position) be joined to the outwardly extending portion by a bend in the flexible dustcap, wherein the bend extends around the longitudinal axis of the loudspeaker (e.g. in a circumferential direction with respect to the longitudinal axis). The first bend, when viewed in a cross-section taken along the longitudinal axis of the loudspeaker, preferably has a smoothly changing curvature, rather than being a sharp fold or corner in the flexible dustcap.

The flexible dustcap may (e.g. when the diaphragm is in its nominal position) include a first corrugation which extends around the longitudinal axis of the loudspeaker (e.g. in a circumferential direction with respect to the longitudinal axis). The first corrugation, when viewed in a cross-section taken along the longitudinal axis of the loudspeaker, may form a ridge or furrow in the flexible dustcap (depending on how it is oriented). The first corrugation may, when viewed in a cross-section taken along the longitudinal axis of the loudspeaker, include two arms which join at a base, e.g. to form a “U” shape or a “V” shape (preferably a “U” shape). Preferably the first corrugation is oriented with its base facing in the backward direction. One arm (preferably the radially innermost arm) of the first corrugation may be joined to the outwardly extending portion, preferably via a non-smoothly changing fold (e.g. a sharp fold or corner) in the flexible dustcap.

The flexible dustcap may (e.g. when the diaphragm is in its nominal position) include a second corrugation which extends around the longitudinal axis of the loudspeaker (e.g. in a circumferential direction with respect to the longitudinal axis). The second corrugation, when viewed in a cross-section taken along the longitudinal axis of the loudspeaker, may form a ridge or furrow in the flexible dustcap (depending on how it is oriented). The second corrugation may, when viewed in a cross-section taken along the longitudinal axis of the loudspeaker, include two arms which join at a base, e.g. to form a “U” shape or a “V” shape (preferably a “U” shape). Preferably the second corrugation is oriented with its base facing in the forward direction. One arm (preferably the radially innermost arm) of the second corrugation may also be an arm (preferably the radially outermost arm) of the first corrugation. One arm (preferably the radially outermost arm) of the second corrugation may attach to the diaphragm, e.g. a front or back surface of the diaphragm, e.g. directly, or via an (optional) outer attachment portion of the flexible dustcap.

The flexible dustcap may (e.g. when the diaphragm is in its nominal position) extend in the direction of the longitudinal axis by a distance (G) above a forward-most location on the voice coil when the diaphragm is at its maximum extent in the forward direction. G is preferably 20 mm or less, more preferably 10 mm or less, more preferably 8 mm or less, more preferably 5 mm or less, more preferably 4 mm or less, more preferably 3 mm or less, more preferably 2 mm or less, more preferably 1 mm or less.

The flexible dustcap may be a single piece of flexible material, e.g. rubber or textile (with or without coating), or may be made of multiple materials attached to each other (a single piece of flexible material is preferred).

The thicknesses and/or materials of different portions of the flexible dustcap may be different to each other so that a desired level of flexibility/stiffness is achieved in each of the different portions.

For example, the upstanding portion may be stiffer than (e.g. by being thicker than) the bend and/or the outwardly extending portion.

For example, the bend may be stiffer than (e.g. by being thicker than) the outwardly extending portion.

For example, the outwardly extending portion may be stiffer than (e.g. by being thicker than) the first and/or second corrugations (in some examples the first and second corrugations may have the same thickness as each other).

The loudspeaker may be a subwoofer. A subwoofer is a loudspeaker dedicated to producing bass frequencies, typically under 250 Hz, more typically under 200 Hz.

The loudspeaker may be used in cars or home entertainment systems, e.g. HiFi loudspeakers, for example.

In a second aspect, the present invention may provide: A flexible dustcap as described herein. The flexible dustcap may be a flexible dustcap as described in connection with the first aspect of the invention, but any other features of a loudspeaker according to the first aspect of the invention being required.

The invention includes the combination of the aspects and preferred features described except where such a combination is clearly impermissible or expressly avoided.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 7:
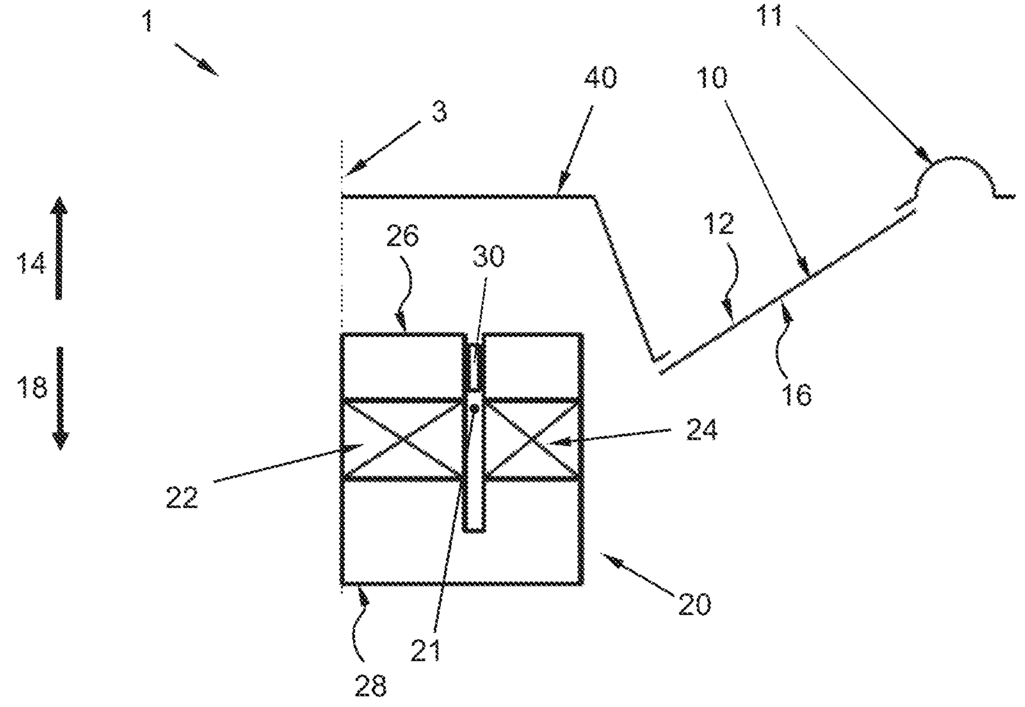
FIG. 7 illustrates a loudspeaker 1 designed by the inventor according to known principles.

FIG. 7 illustrates a loudspeaker 1 designed by the inventor according to known principles. The loudspeaker 1 has a diaphragm 10 having a front surface 12 facing in a forward direction 14 for producing sound to be radiated outwardly from the loudspeaker 1 in the forward direction 14 and a back surface 16 facing in a backward direction 18. In this example, the forward direction 14 is opposite to the backward direction 18, and both the forward and backward directions 14, 18 extend along the longitudinal axis 3. In this example, the diaphragm 10 is circular, though other shapes could be envisaged.

The diaphragm 10 is suspended from a frame of the loudspeaker (not shown in FIG. 7) by a roll suspension 11 (in this example a half-roll edge suspension) which is attached to an outer edge of the diaphragm 10, e.g. by glue, and which extends continuously around the outer edge of the diaphragm 10. For completeness, we note that the attachment between the outer edge of the diaphragm 10 and the roll suspension 11 is illustrated in FIG. 7, but not in subsequent figures.

The loudspeaker 1 also includes an electromagnetic drive unit that includes a magnet unit 20 and a voice coil 30.

The magnet unit 20 is configured to provide magnetic field in an air gap 21 located between two components 22, 24 of the magnet unit 20. In this example, the component 22 is a permanent magnet and the component 24 is a magnetic field guiding element. However, a skilled person would appreciate that the component 22 could be a permanent magnet or a magnetic field guiding element, and the component 24 could be a permanent magnet or a magnetic field guiding element.

The voice coil 30 is rigidly connected to the diaphragm 10. The voice coil 30 is configured to produce a magnetic field in use (by passing a current through it) which interacts with the magnetic field provided by the magnet unit 20 in the air gap 21 so as to move the diaphragm 10 along a longitudinal axis 3 of the loudspeaker 1.

In this example, the voice coil 30 is rigidly connected to the diaphragm 10 via a rigid connector (not shown), which include ribs which extend through slits in the magnetic field guiding element 24. A similar arrangement is employed in the loudspeaker 301 shown in FIG. 16, for example. This arrangement, which involves using a rigid connector 32 to rigidly connect the voice coil 30 to the diaphragm 10 via slits in the magnetic field guiding element 24 is based on principles described e.g. in U.S. Pat. No. 5,081,684. Such an arrangement, particularly when combined with a diaphragm having a relatively flat shape, allows for a loudspeaker having a reduced height.

The diaphragm 10 has a hole at its centre to accommodate a magnet unit 20 (described below), thereby allowing for a loudspeaker of reduced height. A rigid dustcap 40, attached to the front surface 12 of the diaphragm 10 (e.g. by glue), extends across and covers the hole in the middle of the diaphragm 10, so as to prevent dust from getting into the magnet unit 20 via an air gap 21 (described below).

Figure 8:
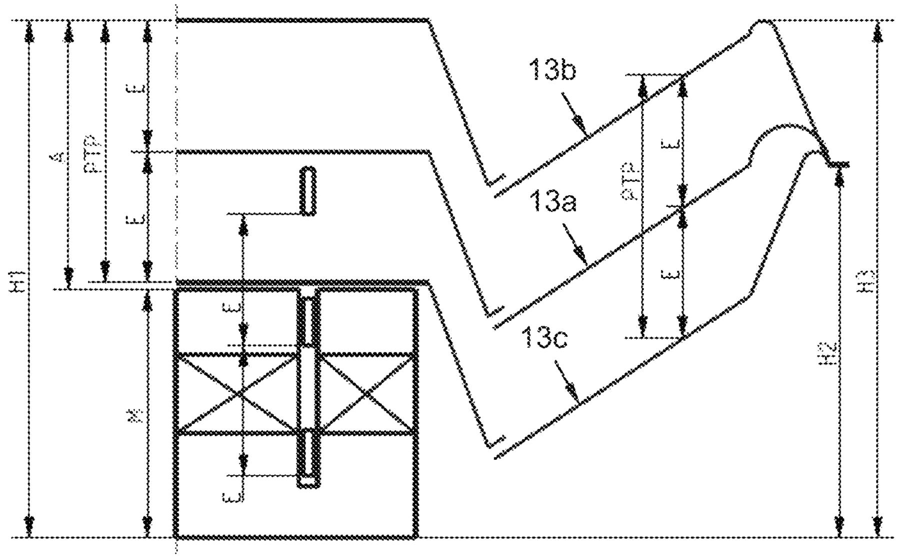
FIG. 8 shows the diaphragm 10 of the loudspeaker 1 of FIG. 7 in each of a nominal position, a maximum extent in a forward direction 14, and a maximum extent in a backward direction 18.

FIG. 8 shows the diaphragm 10 of the loudspeaker 1 of FIG. 7 in each of a nominal position as indicated by numeral 13*a* (this is a rest position, which is the position the diaphragm 10 is in when the voice coil 30 does not have a current passing through it), a maximum extent in the forward direction 14 as indicated by numeral 13*b* and a maximum extent in the backward direction 18 as indicated by numeral 13*c*. The positions of the dustcap 40, the voice coil 30, and the roll suspension 11 when the diaphragm is in each of the three positions are also shown in FIG. 8.

The following distances are also labelled in FIG. 8:

E: excursion distance, this being the distance in the direction of the longitudinal axis 3 between the nominal position (as indicated by numeral 13*a*) and each of the maximum extent in the forward direction 14 (as indicated by numeral 13*b*) and the maximum extent in the backward direction 18 (as indicated by numeral 13*c*) of the diaphragm 10.

PTP: peak to peak excursion distance, this being the distance in the direction of the longitudinal axis 3 between the maximum extent in the forward direction 14 and the maximum extent in the backward direction 18 of the diaphragm 10 (this being twice the excursion distance E)

A: distance in the direction of the longitudinal axis 3 between a front surface 26 of the magnet unit 20 (which faces in the forward direction 14) and a forward-most location on the dustcap 40 when the diaphragm 10 is at its maximum extent in the forward direction 14

H1: distance in the direction of the longitudinal axis 3 between the forward-most location on the dustcap 40 when the diaphragm 10 is at its maximum extent in the forward direction 14 and a rear surface 28 of the magnet unit 20 (which faces in the backward direction 18)

H2: distance in the direction of the longitudinal axis 3 between a point on the frame from which the diaphragm 10 is suspended and the rear surface 28 of the magnet unit 20

H3: distance in the direction of the longitudinal axis 3 between a forward-most location on the roll suspension 11 when the diaphragm 10 is at its maximum extent in the forward direction 14 and the rear surface 28 of the magnet unit 20

M ("magnet unit height"): distance in the direction of the longitudinal axis 3 between the front surface 26 and the rear surface 28 of the magnet unit 20

The rigid dustcap 40 is, as is the case with conventional dustcaps, designed to be stiff, i.e. so that it does not bend (or bends very little) during operation of the loudspeaker 1. The rigid dustcap therefore moves up and down with the diaphragm by the excursion distance E and with a peak to peak excursion distance PTP of 2× E.

As illustrated by FIG. 8, since the rigid dustcap 40 is positioned in front of the magnet unit 20, the total speaker height H1 during operation will be basically be H1=M+A, where A equates to the height of a forward-most location on the rigid dustcap 40 above the front surface of the magnet unit 20 when the diaphragm 10 is at its maximum extent in the forward direction 14. The height A is basically the same as the distance PTP (2×E) with the thickness of the rigid dustcap 40 at the voice coil 30 and small clearance added so that the rigid dustcap 40 does not contact the magnet unit 20 when the diaphragm 10 is at its maximum extent in the backward direction 18.

The present inventor has observed that reducing the outer heights H2, H3 (e.g. by using a diaphragm 10 having a flatter shape and mounting the diaphragm 10 at a lower point on the frame of the loudspeaker 1) does not reduce the speaker height when the diaphragm 10 is at its maximum extent in the forward direction 14, since H1 would still be defining the speaker height in this context.

In other words, the present inventor has observed that a rigid dustcap, such as the rigid dustcap 40, can limit the amount by which the height of a loudspeaker can be reduced when the loudspeaker is in use.

Figure 9:
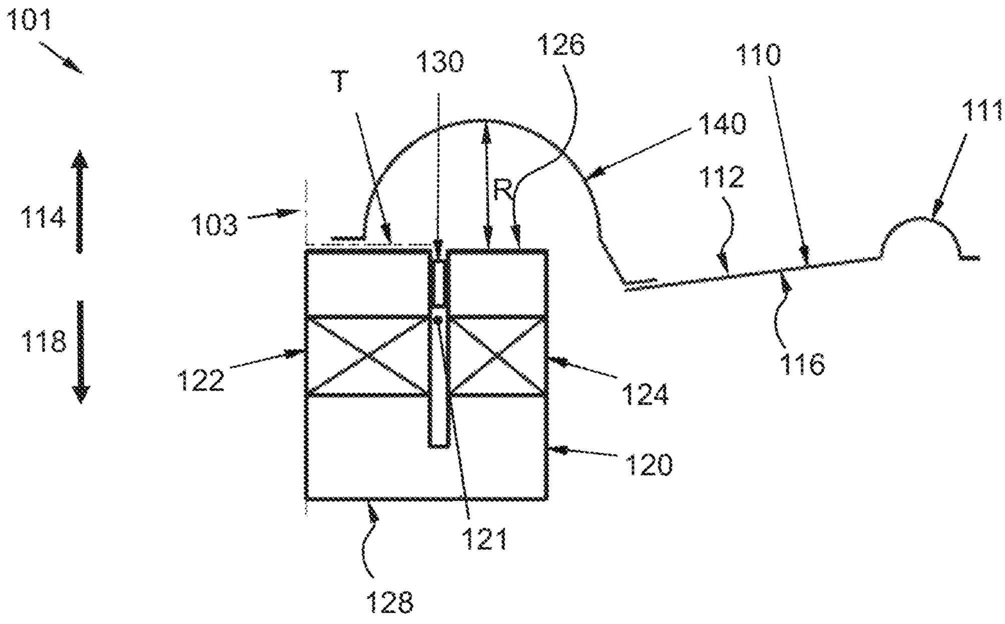
FIG. 9 illustrates a loudspeaker 101 designed by the inventor which includes a flexible dustcap 140.

FIG. 9 illustrates a loudspeaker 101 designed by the inventor which includes a flexible dustcap 140.

The loudspeaker 101 of FIG. 9 is similar to the loudspeaker 1 of FIG. 7 in several respects, and alike components have been given corresponding reference numerals and need not be explained in further detail, except where an alternative explanation is provided below.

In the loudspeaker 101 of FIG. 9, the rigid dustcap 40 of FIG. 7 has been replaced with a flexible dustcap 140. In this example, the flexible dustcap 140 takes the form of a classic half roll edge suspension which is attached to the front surface 112 of the diaphragm 110 and an attachment surface T on the front surface 126 of the magnet unit, which faces in the forward direction 114.

Figure 10:
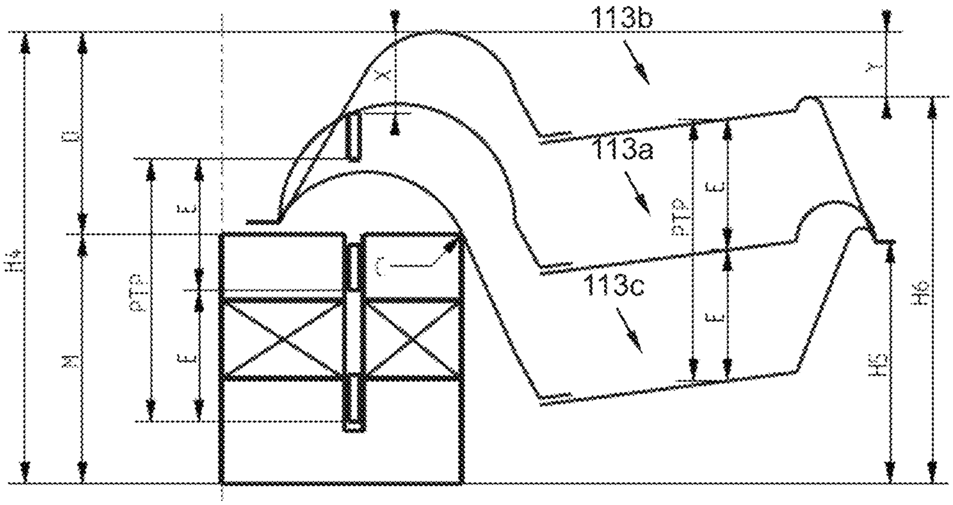
FIG. 10 shows the diaphragm 110 of the loudspeaker 101 of FIG. 3 in each of a nominal position, a maximum extent in a forward direction 114, and a maximum extent in a backward direction 118.

FIG. 10 shows the diaphragm 110 of the loudspeaker 101 of FIG. 7 in each of a nominal position as indicated by numeral 113*a* (this is a rest position, which is the position the diaphragm 110 is in when the voice coil 130 does not have a current passing through it), a maximum extent in the forward direction 114 as indicated by numeral 113*b* and a maximum extent in the backward direction 118 as indicated by numeral 113*c*. The positions of the dustcap 140, the voice coil 130, and the roll suspension 111 when the diaphragm is in each of the three positions are also shown in FIG. 10.

The following distances are also labelled in FIG. 10:

E: excursion distance, this being the distance in the direction of the longitudinal axis 103 between the nominal position (indicated by numeral 113*a*) and each of the maximum extent in the forward direction 114 (as indicated by numeral 113*b*) and the maximum extent in the backward direction 118 (as indicated by numeral 113*c*) of the diaphragm 110.

PTP: peak to peak excursion distance, this being the distance in the direction of the longitudinal axis 103 between the maximum extent in the forward direction 114 and the maximum extent in the backward direction 118 of the diaphragm 110 (this being twice the excursion distance E)

D: distance in the direction of the longitudinal axis 103 between the front surface 126 of the magnet unit 120 and a forward-most location on the flexible dustcap 140 when the diaphragm 110 is at its maximum extent in the forward direction 114

H4: distance in the direction of the longitudinal axis 103 between the forward-most location on the flexible dustcap 140 when the diaphragm 110 is at its maximum extent in the forward direction 114 and the rear surface 128 of the magnet unit 120

H5: distance in the direction of the longitudinal axis 103 between a point on the frame from which the diaphragm 110 is suspended and the rear surface 128 of the magnet unit 120

H6: distance in the direction of the longitudinal axis 103 between a forward-most location on the roll suspension 111 when the diaphragm 110 is at its maximum extent in the forward direction 114 and the rear surface 128 of the magnet unit 120

M: distance in the direction of the longitudinal axis 203 between the front surface 126 and the rear surface 128 of the magnet unit 220

X: distance in the direction of the longitudinal axis 103 between a forward-most location on the voice coil 130 when the diaphragm 110 is at its maximum extent in the forward direction 114 and a forward-most location on the flexible dustcap 140 when the diaphragm 110 is at its maximum extent in the forward direction 114

Y: distance in the direction of the longitudinal axis 103 between a forward-most location on the roll suspension 111 when the diaphragm 110 is at its maximum extent in the forward direction 114 and a forward-most location on the flexible dustcap 140 when the diaphragm 110 is at its maximum extent in the forward direction 114

The radius of curvature R of the half roll edge suspension provided by the flexible dustcap 140 is defined based on a preferred requirement for the flexible dustcap 140 to pass over the voice coil 130 when the diaphragm 110 is at its maximum extent in the forward direction 114, and a preferred requirement for the flexible dustcap 140 to pass over without contacting the corner C of the magnet unit 120 when the diaphragm 110 is at its maximum extent in the backward direction 118. This corner C could be chamfered or rounded to help meet the second of these preferred requirements.

Thus, the radius of curvature R of the half roll edge suspension provided by the flexible dustcap 140 is preferably big with a result that the height D of a forward-most location on the flexible dustcap 140 above the front surface of the magnet unit 120 when the diaphragm 110 is at its maximum extent in the forward direction 14, will still be around 1.5× the excursion E, which is still a considerable height, though less than the corresponding height A of the rigid dustcap 40 (see e.g. FIG. 9, which is explained in more detail below).

For loudspeakers with E=20 mm, this still gives a height D of ~30 mm.

From FIG. 10, the distance X can be seen to be much more than the thickness of the dustcap 140.

The present inventor has observed that reducing the outer height H6 does not reduce the maximum speaker height when the diaphragm is at its maximum extent in the forward direction (as indicated by numeral 13*b*), since H4 would still be defining the speaker height in this context.

A key point to note from FIG. 10 is that replacing a rigid dustcap 40 with a flexible dustcap 140 helps to reduce the height of the loudspeaker when the diaphragm is at its maximum extent in the forward direction by some extent (about 0.5×E).

Figure 11:
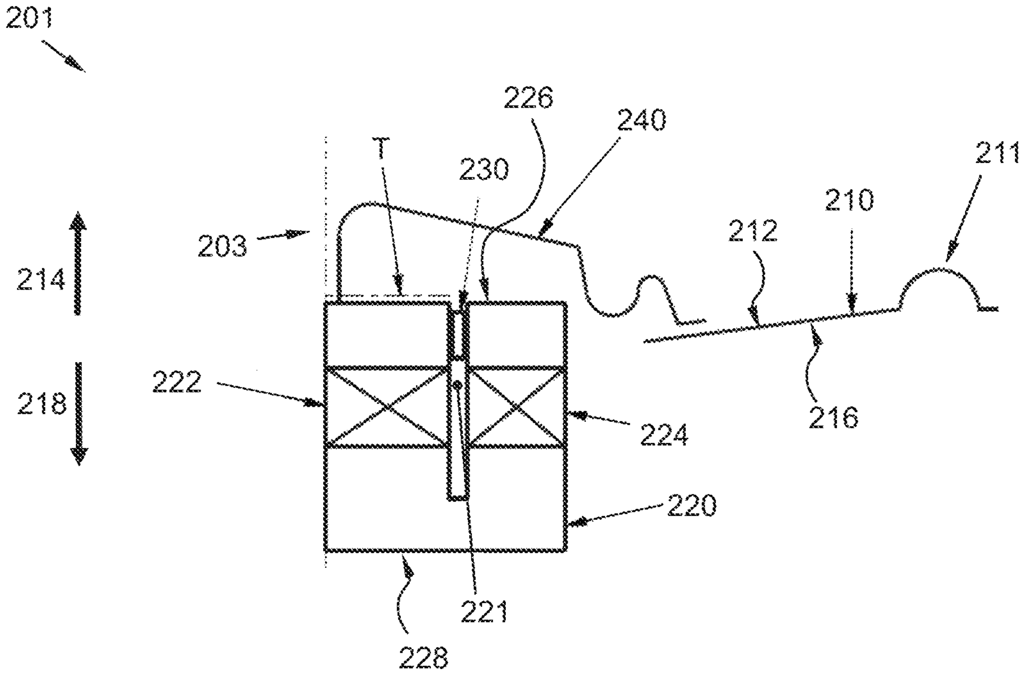
FIG. 11 illustrates a loudspeaker 201 designed by the inventor which includes a flexible dustcap 240.

FIG. 11 illustrates a loudspeaker 201 designed by the inventor which includes a flexible dustcap 240.

The loudspeaker 201 of FIG. 11 is similar to the loudspeaker 101 of FIG. 9 in several respects, and alike components have been given corresponding reference numerals and need not be explained in further detail, except where an alternative explanation is provided below.

In the loudspeaker 201 of FIG. 11, the flexible dustcap 140 of FIG. 9 has been replaced with a different flexible dustcap 240 that includes multiple corrugations.

As with the loudspeaker 101 of FIG. 9, in the loudspeaker 201 the flexible dustcap 240 is attached (in this example) to the front surface 212 of the diaphragm 210 and an attachment surface T, the attachment surface T being (in this example) on the front surface 226 of the magnet unit 220. In other examples (not shown), the flexible dustcap 240 could be attached instead to the back surface 216 of the diaphragm 210 and/or an alternative attachment surface elsewhere in the loudspeaker 201 that is fixed with respect to the magnet unit 220.

Note that since the attachment surface T is on the front surface 226 of the magnet unit 220, it is fixed with respect to the magnet unit 220. The attachment surface T on the front surface 226 of the magnet unit 220 is located radially inwards of the voice coil 230 relative to the longitudinal axis 203 of the loudspeaker 201, so that the flexible dustcap 240 is able to prevent dust from getting into the magnet unit 220 via the air gap 221.

Figure 12:
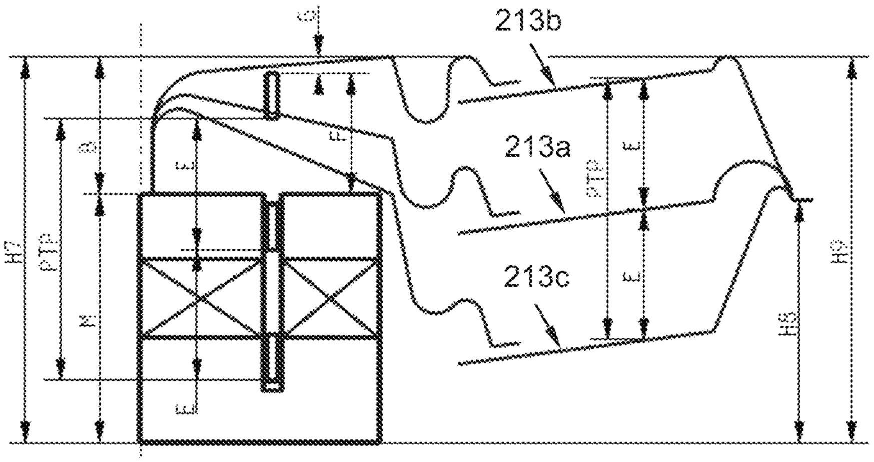
FIG. 12 shows the diaphragm 210 of the loudspeaker 201 of FIG. 11 in each of a nominal position, a maximum extent in a forward direction 214, and a maximum extent in a backward direction 218.

FIG. 12 shows the diaphragm 210 of the loudspeaker 201 of FIG. 5 in each of a nominal position as indicated by numeral 213*a* (this is a rest position, which is the position the diaphragm 210 is in when the voice coil 230 does not have a current passing through it), a maximum extent in the forward direction 214 as indicated by numeral 213*b* and a maximum extent in the backward direction 218 as indicated by numeral 213*c*. The positions of the dustcap 240, the voice coil 230, and the roll suspension 211 when the diaphragm is in each of the three positions are also shown in FIG. 12.

The following distances are also labelled in FIG. 12:

E: excursion distance, this being the distance in the direction of the longitudinal axis 203 between the nominal position (indicated by numeral 213*a*) and each of the maximum extent in the forward direction 214 (as indicated by numeral 213*b*) and the maximum extent in the backward direction 218 (as indicated by numeral 213*c*) of the diaphragm 210.

PTP: peak to peak excursion distance, this being the distance in the direction of the longitudinal axis 203 between the maximum extent in the forward direction 214 and the maximum extent in the backward direction 218 of the diaphragm 210 (this being twice the excursion distance E)

B: distance in the direction of the longitudinal axis 203 between the front surface 226 of the magnet unit 220 and a forward-most location on the flexible dustcap 240 when the diaphragm 210 is at its maximum extent in the forward direction 214

H7: distance in the direction of the longitudinal axis 203 between the forward-most location on the flexible dustcap 240 when the diaphragm 210 is at its maximum extent in the forward direction 214 and the rear surface 228 of the magnet unit 220

H8: distance in the direction of the longitudinal axis 203 between a point on the frame from which the diaphragm 210 is suspended and the rear surface 228 of the magnet unit 220

H9: distance in the direction of the longitudinal axis 203 between a forward-most location on the roll suspension 211 when the diaphragm 210 is at its maximum extent in the forward direction 214 and the rear surface 228 of the magnet unit 220

M: distance in the direction of the longitudinal axis 203 between the front surface 226 and the rear surface 228 of the magnet unit 220

F: distance in the direction of the longitudinal axis 203 between the front surface 226 of the magnet unit 220 and a forward-most location on the voice coil 230 when the diaphragm 210 is at its maximum extent in the forward direction 214

G: distance in the direction of the longitudinal axis 203 between a forward-most location on the voice coil 230 when the diaphragm 210 is at its maximum extent in the forward direction 214 and a forward-most location on the flexible dustcap 240 when the diaphragm 210 is at its maximum extent in the forward direction 214

As shown, the flexible dustcap 240 is configured to allow the diaphragm 210 to be moved from a nominal position up to a maximum extent in the forward direction 214 and a maximum extent in the backward direction 218 without the flexible dustcap contacting the magnet unit 220 or the voice coil 230 in use.

Because of its shape, the height B of a forward-most location on the flexible dustcap 240 above the front surface of the magnet unit 220 when the diaphragm 210 is at its maximum extent in the forward direction 214, is able to be closer to the excursion E, compared with the flexible dustcap 140 of FIG. 9.

As shown, the flexible dustcap extends in the direction of the longitudinal axis 203 by a distance G above the forward-most location on the voice coil 230 when the diaphragm 210 is at its maximum extent in the forward direction. G is preferably 20 mm or less, more preferably 10 mm or less, more preferably 8 mm or less, 5 mm or less, more preferably 4 mm or less, more preferably 3 mm or less, more preferably 2 mm or less, more preferably 1 mm or less and may in practice be ~3 mm.

In effect, the flexible dustcap 240 of the loudspeaker 201 FIG. 11 allows the loudspeaker 201 to have a height (when the diaphragm is at its maximum extent in the forward direction) that is limited to the position of the voice coil 230 plus the thickness of the flexible dustcap 230 at the voice coil, plus a small clearance.

It may be challenging, though not impossible, to have G substantially below ~5 mm because in practice, a clearance e.g. of ~1 mm between the voice coil 230 and the dustcap 240 may be required when the diaphragm 210 is at its maximum extent in the forward direction, the dustcap 240 may have a thickness of ~2 mm in this region, and there could also be a contribution to G of 1-2 mm from the upward slope of an outwardly extending portion 242 of the flexible dustcap 240 when the diaphragm 210 is at its maximum extent in the forward direction.

Figure 13:
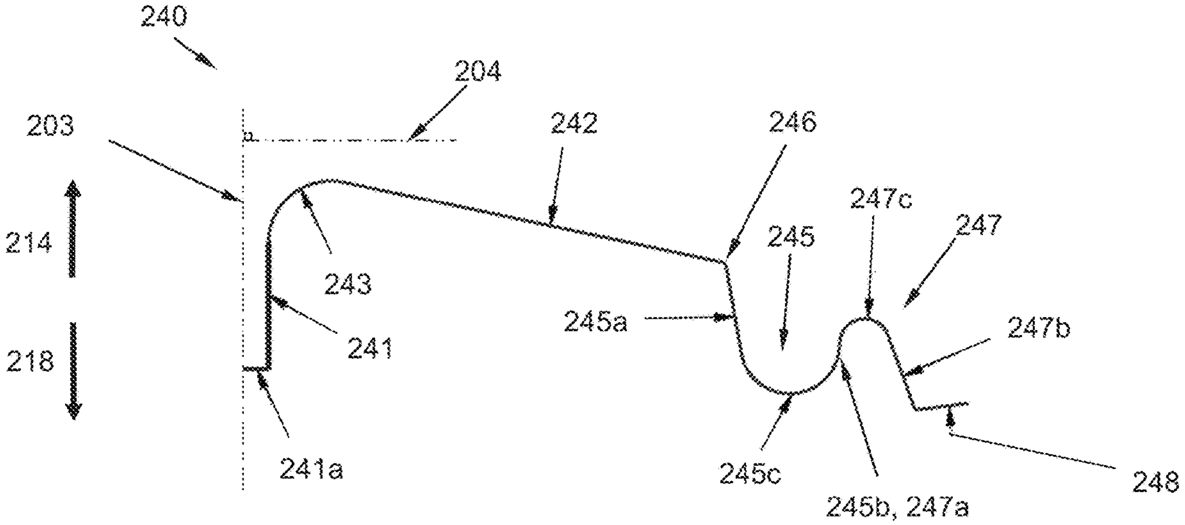
FIG. 13 shows the flexible dustcap 240 of the loudspeaker 201 of FIG. 11 in more detail.

The flexible dustcap 240 of the loudspeaker 201 of FIG. 5 is shown in more detail in FIG. 13. Various features and properties of the flexible dustcap 240 will now be described with reference to when the diaphragm 210 is in its nominal position (since other positions of the diaphragm 210 may cause the flexible dustcap 240 to deform).

As shown in FIG. 13, the flexible dustcap 240 may include an upstanding portion 241 which extends around the longitudinal axis 203 of the loudspeaker 201 and which, when viewed in a cross-section taken along the longitudinal axis 203 of the loudspeaker 201 (as represented in FIG. 13), extends in the forwards direction 214 from the attachment surface on the front surface 226 of the magnet unit 220, preferably at an angle that is no more than 30° with respect to the longitudinal axis 203 of the loudspeaker 201, though larger angles may be possible if the upstanding portion 241 is adequately stiff. The upstanding portion 241 may attach to the attachment surface directly, or via an (optional) inner attachment portion 241*a* of the flexible dustcap 240. The upstanding portion 241 may help to create a distance (in the direction of the longitudinal axis 203) between the front surface 226 of the magnet system 20 and the start of an outwardly extending portion 242 of the flexible dustcap 240 (described below). To achieve this function, the upstanding portion 241 may be stiffer than other regions of the flexible dustcap 240. Such stiffness may be achieved by the outwardly extending portion 242 having a thickness that is larger than some other regions of the flexible diaphragm 240, or by adding additional stiffening material in this region of the flexible dustcap 240.

Although in this example, the attachment surface T is on the front surface 226 of the magnet unit 220, the attachment surface T could be located on other elements of the loudspeaker (e.g. the frame of the loudspeaker) though the attachment surface T is preferably fixed with respect to the magnet unit 220.

The flexible dustcap 240 may include an outwardly extending portion 242 which extends around the longitudinal axis 203 of the loudspeaker 201 and which, when viewed in a cross-section taken along the longitudinal axis 203 of the loudspeaker 201 (as represented in FIG. 13), extends radially outwards from the upstanding portion 241 relative to the longitudinal axis 203 of the loudspeaker 201. The outwardly extending portion may, when viewed in a cross-section taken along the longitudinal axis 203 of the loudspeaker 201, form an angle that is no more than 20° with respect to a radial axis 204 that extends radially outwardly from and is perpendicular to the longitudinal axis 203 of the loudspeaker 201. The outwardly extending portion 242 is preferably adequately stiff and resists bending in use in order to create space for the voice coil 230 when the diaphragm 210 is at its maximum extent in the forward direction 214. Such stiffness may be achieved by the outwardly extending portion 242 having a thickness that is larger than some other regions of the flexible diaphragm 210, or by adding additional stiffening material in this region of the flexible dustcap 240.

The upstanding portion 241 may be joined to the outwardly extending portion 242 by a bend 243 in the flexible dustcap 240, wherein the bend 243 extends around the longitudinal axis 203 of the loudspeaker 201. The bend 243, when viewed in a cross-section taken along the longitudinal axis 203 of the loudspeaker 201 (as represented in FIG. 13), preferably has a smoothly changing curvature, rather than being a sharp fold or corner in the flexible dustcap 240. The bend 243 may allow the outwardly extending portion 242 to move forwards and backwards with movement of the diaphragm 210.

The flexible dustcap 240 may include a first corrugation 245 which extends around the longitudinal axis 203 of the loudspeaker 201. The first corrugation 245, when viewed in a cross-section taken along the longitudinal axis 203 of the loudspeaker 201 (as represented in FIG. 13), may form a ridge or furrow in the flexible dustcap (the first corrugation 245 as oriented in FIG. 13 may be viewed as forming a furrow). The first corrugation 245 may, when viewed in a cross-section taken along the longitudinal axis 203 of the loudspeaker, include two arms 245*a*, 245*b* which join at a base 245*c*, e.g. to form a "U" shape or a "V" shape (preferably a "U" shape as shown in FIG. 13). Preferably the first corrugation 245 is oriented with its base 245*c* facing in the backward direction 218 (as shown in FIG. 13). One arm (preferably the radially innermost arm 245*a*) of the first corrugation 245 may be joined to the outwardly extending portion 242, preferably via a non-smoothly changing fold 246 (e.g. a sharp fold or corner) in the flexible dustcap 240. In some examples, the radially innermost arm 245*a* of the first corrugation 245 may form an angle that is no more than 20° with respect to the longitudinal axis 203 of the loudspeaker 201. The radially innermost arm 245*a* of the first corrugation 245 may allow the flexible dustcap 240 to get closer to the diaphragm 210 and may be configured to roll off when the diaphragm 210 is at maximum excursion in the backward direction 218, as shown e.g. in FIG. 12.

The flexible dustcap 240 may include a second corrugation 247 which extends around the longitudinal axis 203 of the loudspeaker 201. The second corrugation 247, when viewed in a cross-section taken along the longitudinal axis 203 of the loudspeaker 201, may form a ridge or furrow in the flexible dustcap 240 (the second corrugation 247 as oriented in FIG. 13 may be viewed as forming a ridge). The second corrugation 247 may, when viewed in a cross-section taken along the longitudinal axis 203 of the loudspeaker 201, include two arms 247*a*, 247*b* which join at a base 247*c*, e.g. to form a "U" shape or a "V" shape (preferably a "U" shape as shown in FIG. 13). Preferably the second corrugation 247 is oriented with its base 247*c* facing in the forward direction 214 (as shown in FIG. 13). One arm (preferably the radially innermost arm 247*a*) of the second corrugation 247 may also be the radially outermost arm 245*b* of the first corrugation 245. One arm (preferably the radially outermost arm 247*b*) of the second corrugation 247 may attach to the front surface 212 or back surface 216 of the diaphragm 210, e.g. directly, or via an (optional) outer attachment portion 248 of the flexible dustcap 240. In some examples, the radially outermost arm 247*b* of the second corrugation 247 may form an angle that is no more than 20° with respect to the longitudinal axis 203 of the loudspeaker 201. The radially outermost arm 247*b* of the second corrugation 247 may be configured to roll off when the diaphragm is at maximum excursion in the forward direction, as shown e.g. in FIG. 12.

The first and second corrugations 245, 247 are preferably configured to bend in the forward and backward directions during movement of the diaphragm 210 in the forward and backward directions.

The flexible dustcap 240 may be a single piece of rubber.

Although not shown in the figures, the upstanding portion 341 may be slightly thicker than the bend 343, which is in turn may be slightly thicker than the outwardly extending portion 342, with the thickness of the outwardly extending portion 342 optionally being thicker than the first and second corrugations 345, 347 (which may e.g. have the same thickness as each other). These relative thicknesses may help the different portions of the flexible dustcap 340 to have different stiffnesses so that the portions function as described above.

It is noted for completeness that the upstanding portion 241, the bend 243, the outwardly extending portion 242 and the radially innermost arm 245*a* of the first corrugation 245 can together be seen as forming a further (third) corrugation (which, as oriented in FIG. 13 may be viewed as forming a ridge) in the flexible dustcap 240.

Figure 14:
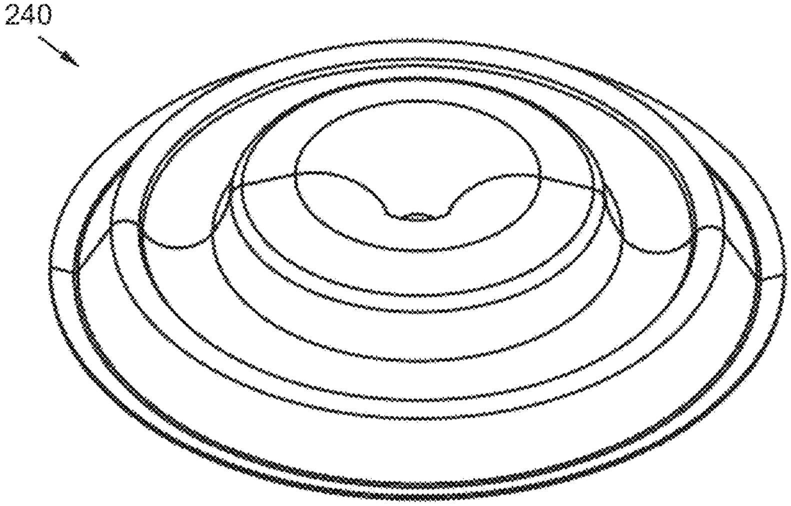
FIG. 14 is a perspective view of the flexible dustcap 240 of the loudspeaker 201 of FIG. 11, with a line drawn over the flexible dustcap to illustrate its profile.

FIG. 14 is a perspective view of the flexible dustcap 240 of the loudspeaker 201 of FIG. 11, with a line drawn over the flexible dustcap to illustrate its profile.

FIG. 15 provides a comparison between the heights A, D, B of the dustcaps of the loudspeakers 1, 101, 201 of FIGS. 7, 9 and 11 above the front surface of the magnet unit when the diaphragm is at its maximum extent in the forward direction.

FIG. 15 demonstrates that the flexible dustcap 240 of the loudspeaker 201 of FIG. 11 is capable of significantly reducing the height of a loudspeaker when the diaphragm is at its maximum extent in the forward direction compared with the other designs, particularly where the diaphragm has a relatively flat shape as shown in FIG. 15.

Figure 16:
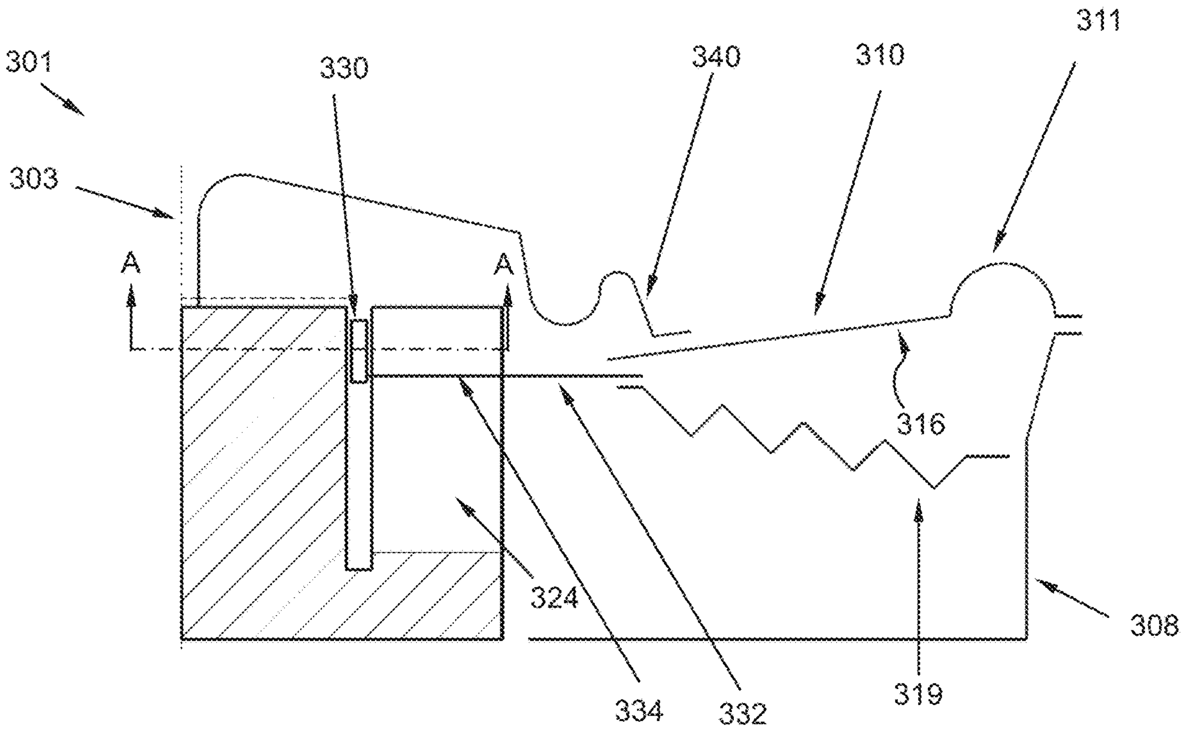
FIGS. 16-17 illustrate an example loudspeaker 301 which includes a flexible dustcap 340 and which represents an example implementation of the loudspeaker 201 of FIG. 11.
Figure 17:
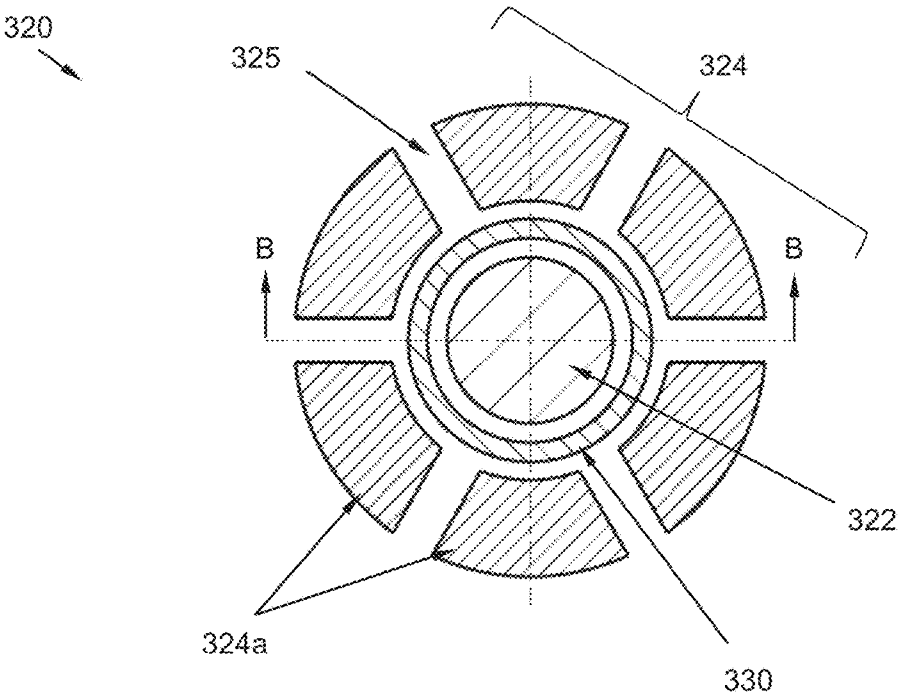

FIGS. 16-17 illustrate an example loudspeaker 301 which includes a flexible dustcap 340 and which represents an example implementation of the loudspeaker 201 of FIG. 11.

The loudspeaker 301 of FIG. 16 is similar to the loudspeaker 201 of FIG. 11 in several respects, and alike components have been given corresponding reference numerals and need not be explained in further detail, except where an alternative explanation is provided below.

FIG. 16 is a cross-section of the loudspeaker 301 taken along a plane illustrated by the line B-B shown in FIG. 17. FIG. 17 is a cross section of the loudspeaker 301 taken along a plane illustrated by the line A-A in FIG. 16.

FIG. 17 clearly show the slits in the magnetic field guiding element 324 of the magnet unit 320. In this case, the slits extend entirely through the magnetic field guiding element 324, such that the magnetic field guiding element 324 is formed of multiple bodies 324*a*. It may therefore be noted that it is easier to form slits in a magnetic field guiding element 324 than it would be in a permanent magnet (particularly where the slits extend entirely through the permanent magnet, which would in effect require multiple permanent magnets), hence it may be preferred for the permanent magnet to be located radially inwards (relative to the longitudinal axis 303) of the voice coil 330, rather than radially outwards of the voice coil 330.

In the example loudspeaker 301 illustrated in FIG. 16, a frame 308 of the loudspeaker is made of metal.

FIG. 16 shows the rigid connector 332 which rigidly connects the voice coil 330 to the diaphragm 310 via ribs 334 which extend through slits 325 in the magnetic field guiding element 324. In this example, there are six such ribs 334, though of course other numbers are possible. In this example, the rigid connector 332 is glued to the voice coil 330 (there is no voice coil former in this example) and glued to the back surface 316 of the diaphragm 310.

The cross section of FIG. 16 is taken through one of the slits 325 in the magnetic field guiding element 324 in order to illustrate the connection between the rigid connector 332, the diaphragm 310 and the voice coil 330.

FIG. 16 also shows that the loudspeaker 301 includes a spider 319 which connects to the diaphragm (by being glued to the rigid connector 332) and is also attached, e.g by glue, to the frame 308.

Statements:

A1. A loudspeaker including:

a diaphragm having a front surface facing in a forward direction for producing sound to be radiated outwardly from the loudspeaker in the forward direction and a back surface facing in a backward direction that is opposite to the forward direction;

a magnet unit configured to provide magnetic field in a predetermined region of space;

a voice coil rigidly connected to the diaphragm, wherein the voice coil is configured to produce a magnetic field in use which interacts with the magnetic field provided by the magnet unit in the predetermined region of space so as to move the diaphragm along a longitudinal axis of the loudspeaker;

a flexible dustcap attached to the diaphragm and an attachment surface of the loudspeaker that is fixed with respect to the magnet unit and is located radially inwards of the voice coil relative to the longitudinal axis of the loudspeaker.

A2. A loudspeaker according to statement A1, wherein the flexible dustcap includes more than one corrugation.

A3. A loudspeaker according to statement A1 or A2, wherein the flexible dustcap is configured to allow the diaphragm to be moved along the longitudinal axis from a nominal position up to a maximum extent in the forward direction and a maximum extent in the backward direction without the flexible dustcap contacting the magnet unit or the voice coil in use.

A4. A loudspeaker according to any previous statement, wherein the voice coil is rigidly connected to the diaphragm via a rigid connector, wherein the rigid connector includes ribs which extend through slits in a component located radially outwards of the voice coil, wherein the component that includes the slits is one of the two components of the magnet unit between which an air gap is located, wherein the air gap is the predetermined region of space.

A5. A loudspeaker according to any previous statement, wherein the loudspeaker has a height in the direction of the longitudinal axis of the loudspeaker from a forward-most surface to a backward-most surface of the loudspeaker when the diaphragm is at its maximum extent in the forward direction of 75 mm or less, wherein the distance in the direction of the longitudinal axis between the maximum extent in the forward direction and the maximum extent in the backward direction of the diaphragm is 30 mm or more.

A6. A loudspeaker according to any previous statement, wherein the attachment surface is a surface of the magnet unit, or a surface on a frame of the loudspeaker that is fixed with respect to the magnet unit.

A7. A loudspeaker according to any previous statement, wherein the flexible dustcap includes an upstanding portion which extends around the longitudinal axis of the loudspeaker and which, when viewed in a cross-section taken along the longitudinal axis of the loudspeaker, extends in the forwards direction from the attachment surface of the loudspeaker.

A8. A loudspeaker according to statement A7, wherein the upstanding portion, when viewed in a cross-section taken along the longitudinal axis of the loudspeaker, extends in the forwards direction from the attachment surface of the loudspeaker at an angle that is no more than 30° with respect to the longitudinal axis of the loudspeaker.

A9. A loudspeaker according to any previous statement, wherein the flexible dustcap includes an outwardly extending portion which extends around the longitudinal axis of the loudspeaker and which, when viewed in a cross-section taken along the longitudinal axis of the loudspeaker, extends radially outwards from the upstanding portion relative to the longitudinal axis of the loudspeaker.

A10. A loudspeaker according to statement A9, wherein the outwardly extending portion, when viewed in a cross-section taken along the longitudinal axis of the loudspeaker, forms an angle that is no more than 20° with respect to a radial axis that extends radially outwardly from and is perpendicular to the longitudinal axis of the loudspeaker.

A11. A loudspeaker according to any previous statement, wherein the flexible dustcap includes a first corrugation which extends around the longitudinal axis of the loudspeaker.

A12. A loudspeaker according to statement A11, wherein the first corrugation, when viewed in a cross-section taken along the longitudinal axis of the loudspeaker, includes two arms which join at a base, wherein the first corrugation is oriented with its base facing in the backward direction.

A13. A loudspeaker according to any of statements A11-A12, wherein the flexible dustcap includes a second corrugation which extends around the longitudinal axis of the loudspeaker A14. A loudspeaker according to statement A13, wherein the second corrugation, when viewed in a cross-section taken along the longitudinal axis of the loudspeaker, includes two arms which join at a base, wherein the second corrugation is oriented with its base facing in the forward direction.

A15. A loudspeaker according to statement A13, wherein the radially innermost arm of the second corrugation is also a radially outermost arm of the first corrugation, and the radially outermost arm of the second corrugation attaches to the diaphragm.

A16. A loudspeaker according to any previous statement, wherein the flexible dustcap extends in the direction of the longitudinal axis by a distance G above a forward-most location on the voice coil when the diaphragm is at its maximum extent in the forward direction, wherein G is 10 mm or less.

A17. A loudspeaker according to any previous statement, wherein the flexible dustcap is a single piece of flexible material, e.g. rubber or textile (with or without coating), wherein the thicknesses of different portions of the flexible dustcap are different to each other.

A18. A loudspeaker according to any one of statements A1-A16, wherein the materials of different portions of the flexible dustcap are different to each other.

A19. A loudspeaker according to any previous statement, wherein the loudspeaker is a subwoofer.

The invention claimed is:

1. A loudspeaker including:

a diaphragm having a front surface facing in a forward direction for producing sound to be radiated outwardly from the loudspeaker in the forward direction and a back surface facing in a backward direction that is opposite to the forward direction;

a magnet unit configured to provide magnetic field in a magnetic gap, wherein the magnetic gap is located between a first portion of the magnet unit located radially inwards of the magnetic gap with respect to a longitudinal axis of the loudspeaker and a second portion of the magnet unit located radially outwards of the magnetic gap with respect to the longitudinal axis of the loudspeaker;

a voice coil, configured to sit in the magnetic gap when the diaphragm is in a rest position, and is further configured to produce a magnetic field in use which interacts with the magnetic field provided by the magnet unit in the magnetic gap so as to move the diaphragm along the longitudinal axis of the loudspeaker;

wherein the height of the voice coil in the direction of the longitudinal axis of the loudspeaker is less than the height of the magnetic gap in the direction of the longitudinal axis of the loudspeaker;

wherein the voice coil is rigidly connected to the diaphragm via a rigid connector, wherein the rigid connector includes ribs which extend radially outwardly from the voice coil through slits in the second portion of the magnetic unit;

wherein the first portion of the magnet unit and the second portion of the magnet unit are configured such that magnetic flux density of the magnetic field in the magnetic gap reaches a first local maximum at a first peak location along the longitudinal axis of the loudspeaker and a second local maximum at a second peak location along the longitudinal axis of the loudspeaker, wherein the first peak location and the second peak location are separated spatially in the direction of the longitudinal axis of the loudspeaker by a valley region in which the magnetic flux density is lower than both the first local maximum and the second local maximum, wherein the voice coil is configured to be positioned in the valley region when the diaphragm is in its rest position.

2. A loudspeaker according to claim 1, wherein the height of the voice coil of the loudspeaker measured in the direction of the longitudinal axis is 15 mm or less.

3. A loudspeaker according to claim 1, wherein the height of the magnet unit of the loudspeaker measured in the direction of the longitudinal axis is 15 mm or less.

4. A loudspeaker according to claim 1, wherein the maximum mechanical excursion of the loudspeaker is 12 mm or more.

5. A loudspeaker according to claim 1, wherein the voice coil includes two or more winding layers.

6. A loudspeaker according to claim 1, wherein a wire from which the voice coil is formed has a square or rectangular cross section.

7. A loudspeaker according to claim 1, wherein the loudspeaker includes a flexible dustcap attached to the diaphragm and an attachment surface of the loudspeaker that is fixed with respect to the magnet unit and is located radially inwards of the voice coil relative to the longitudinal axis of the loudspeaker.

8. A loudspeaker according to claim 7, wherein the attachment surface includes a recessed portion to facilitate attachment of the flexible dustcap to the attachment surface.

9. A loudspeaker according to claim 7, wherein any one or more of the following features are included:

the attachment surface is a front surface of the magnet unit;

the flexible dustcap, when the diaphragm is in its rest position, includes an upstanding portion which extends around the longitudinal axis of the loudspeaker and which, when viewed in a cross-section taken along the longitudinal axis of the loudspeaker, extends in the forwards direction from the attachment surface of the loudspeaker;

the flexible dustcap, when the diaphragm is in its rest position, includes an outwardly extending portion which extends around the longitudinal axis of the loudspeaker and which, when viewed in a cross-section taken along the longitudinal axis of the loudspeaker, extends radially outwards from the upstanding portion relative to the longitudinal axis of the loudspeaker;

the upstanding portion is joined to the outwardly extending portion by a bend in the flexible dustcap, wherein the bend extends around the longitudinal axis of the loudspeaker;

the flexible dustcap, when the diaphragm is in its rest position, includes a first corrugation which extends around the longitudinal axis of the loudspeaker;

the flexible dustcap, when the diaphragm is in its rest position, includes a second corrugation which extends around the longitudinal axis of the loudspeaker.

10. A loudspeaker according to claim 1, wherein the first portion of the magnet unit and/or the second portion of the magnet unit is a washer configured to guide magnetic flux across the magnetic gap.

11. A loudspeaker according to claim 10, wherein the loudspeaker includes a single magnet which is configured to provide magnetic flux to the first and second portions of the magnet unit.

12. A loudspeaker according to claim 1, wherein the first and/or second portion of the magnet unit is a washer that includes at least one recess at a location along the longitudinal axis corresponding to the valley region.

13. A loudspeaker according to claim 12, wherein the at least one recess accommodates a shorting ring.

14. A loudspeaker according to claim 1, wherein the loudspeaker is a subwoofer configured to produce sound with frequencies in a bass frequency range.

15. A loudspeaker according to claim 1, wherein the loudspeaker includes a voice coil former, and the voice coil former is attached to or integrally formed with the rigid connector.

* * * * *